(12) United States Patent
Kochunni et al.

(10) Patent No.: US 7,539,783 B2
(45) Date of Patent: May 26, 2009

(54) SYSTEMS AND METHODS OF MEDIA MANAGEMENT, SUCH AS MANAGEMENT OF MEDIA TO AND FROM A MEDIA STORAGE LIBRARY, INCLUDING REMOVABLE MEDIA

(75) Inventors: Jaidev O. Kochunni, Eatontown, NJ (US); Ho-Chi Chen, Marlboro, NJ (US); Manoj Kumar Vijayan Retnamma, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 167 days.

(21) Appl. No.: 11/694,803

(22) Filed: Mar. 30, 2007

(65) Prior Publication Data

US 2008/0077715 A1 Mar. 27, 2008

Related U.S. Application Data

(60) Provisional application No. 60/846,663, filed on Sep. 22, 2006.

(51) Int. Cl.
*G06F 3/00* (2006.01)
(52) U.S. Cl. .................. 710/16; 710/8; 710/9; 710/10; 710/15; 710/34; 710/35; 710/36; 710/19; 710/74
(58) Field of Classification Search ............... 710/8–10, 710/34–36, 15, 16, 19, 74
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |

(Continued)

FOREIGN PATENT DOCUMENTS

EP 0259912 3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Tammara Peyton
(74) *Attorney, Agent, or Firm*—Perkins Coie LLP

(57) ABSTRACT

A system and method for determining media to be exported out of a media library is described. In some examples, the system determines a media component to be exported, determines the media component is in the media library for a specific process, and exports the media component after the process is completed.

20 Claims, 18 Drawing Sheets

U.S. PATENT DOCUMENTS

| | | | |
|---|---|---|---|
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,412,668 | A | 5/1995 | Dewey |
| 5,448,724 | A | 9/1995 | Hayashi et al. |
| 5,491,810 | A | 2/1996 | Allen |
| 5,495,457 | A | 2/1996 | Takagi et al. |
| 5,495,607 | A | 2/1996 | Pisello et al. |
| 5,499,364 | A | 3/1996 | Klein et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,548,521 | A | 8/1996 | Krayer et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,893,139 | A | 4/1999 | Kamiyama et al. |
| 5,898,593 | A | 4/1999 | Baca et al. |
| 5,901,327 | A | 5/1999 | Ofek |
| 5,924,102 | A | 7/1999 | Perks |
| 5,950,205 | A | 9/1999 | Aviani, Jr. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem et al. |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,195,794 | B1 | 2/2001 | Buxton |
| 6,212,512 | B1 | 4/2001 | Barney et al. |
| 6,260,069 | B1 | 7/2001 | Anglin |
| 6,266,784 | B1 | 7/2001 | Hsiao et al. |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton et al. |
| 6,330,572 | B1 | 12/2001 | Sitka |
| 6,330,642 | B1 | 12/2001 | Carteau |
| 6,338,006 | B1 | 1/2002 | Jesionowski et al. |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,366,900 | B1 | 4/2002 | Hu |
| 6,374,336 | B1 | 4/2002 | Peters et al. |
| 6,389,432 | B1 | 5/2002 | Pothapragada et al. |
| 6,421,711 | B1 | 7/2002 | Blumenau et al. |
| 6,457,017 | B2 | 9/2002 | Watkins et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,658,526 | B2 | 12/2003 | Nguyen et al. |
| 6,721,334 | B1 * | 4/2004 | Ketcham ............... 370/473 |
| 6,950,723 | B2 | 9/2005 | Gallo et al. |
| 6,973,369 | B2 | 12/2005 | Trimmer et al. |
| 7,010,387 | B2 | 3/2006 | Lantry et al. |
| 7,069,466 | B2 | 6/2006 | Trimmer et al. |
| 2003/0101155 | A1 | 5/2003 | Gokhale et al. |
| 2005/0013149 | A1 | 1/2005 | Trossell |
| 2005/0021524 | A1 | 1/2005 | Oliver |
| 2005/0039069 | A1 | 2/2005 | Prahlad et al. |
| 2005/0174869 | A1 | 8/2005 | Kottomtharayil et al. |
| 2006/0169769 | A1 * | 8/2006 | Boyarsky et al. ........... 235/381 |

FOREIGN PATENT DOCUMENTS

| | | |
|---|---|---|
| EP | 0405926 | 1/1991 |
| EP | 0467546 | 1/1992 |
| EP | 0620553 | 10/1994 |
| EP | 0774715 | 5/1997 |
| EP | 0809184 | 11/1997 |
| EP | 0899662 | 3/1999 |
| EP | 0981090 | 2/2000 |
| JP | 7254204 | 10/1995 |
| JP | 9044381 | 2/1997 |
| JP | 9081424 | 3/1997 |
| WO | WO-95/13580 | 5/1995 |
| WO | WO-99/12098 | 3/1999 |
| WO | WO-2005/024573 | 3/2005 |

OTHER PUBLICATIONS

Arneson,"Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System,"*Operating Systems Review SIGOPS*, vol. 25, No. 5, New York, US, pp. 1-15 (May 1991).

U.S. Appl. No. 11/694,748, filed Mar. 30, 2007, Gokhale et al.
U.S. Appl. No. 12/058,467, filed Mar. 28, 2008, Kottomtharayil.
U.S. Appl. No. 12/060,160, filed Mar. 31, 2008, Gokhale.
U.S. Appl. No. 12/060,169, filed Mar. 31, 2008, Gokhale.
U.S. Appl. No. 12/060,175, filed Mar. 31, 2008, Muller.
U.S. Appl. No. 12/060,181, filed Mar. 31, 2008, Muller.

Carrington D: "Backups Using The "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 22, 2006].

Campbell C: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006].

Cook P: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&q=%22ntbackup+eject%22+at&rnum=1&hl=de#0ab1d93a6f1b511> [retrieved on Aug. 22, 2006].

Savill J: "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006].

MDM: "Automatically eject tape", Internet Publication, [Online] Jun. 7, 1999, Retrieved from Internet: URL: <http://groups.google.de/group/microsoft.public.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006].

Non-Final Office Action for U.S. Appl. No. 09/991,900, Mail Date Aug. 18, 2008, Examiner T. Chen, 10 pages.

First Office Action for Japanese Application No. 2003-548129, Mail Date Sep. 2, 2008, 4 pages.

* cited by examiner

SYSTEMS AND METHODS OF MEDIA MANAGEMENT, SUCH AS MANAGEMENT OF MEDIA TO AND FROM A MEDIA STORAGE LIBRARY, INCLUDING REMOVABLE MEDIA

CROSS-REFERENCE TO RELATED APPLICATION(S)

The present application claims priority to U.S. Provisional Patent Application No. 60/846,663 entitled "SYSTEMS AND METHODS OF MEDIA MANAGEMENT, SUCH AS MANAGEMENT OF MEDIA TO AND FROM A MEDIA STORAGE LIBRARY, INCLUDING REMOVABLE MEDIA," and filed on Sep. 22, 2006, which is hereby incorporated by reference.

This application is related to the following patents and pending U.S. applications, each of which is hereby incorporated herein by reference in its entirety: U.S. patent application Ser. No. 09/991,900, filed Nov. 23, 2001, entitled METHOD AND SYSTEM FOR SCHEDULING MEDIA EXPORTS, U.S. patent application Ser. No. 10/819,102, filed Apr. 5, 2004, entitled METHOD AND SYSTEM FOR CONTROLLING A ROBOTIC ARM IN A STORAGE DEVICE, U.S. patent application Ser. No. 10/818,750, filed Apr. 5, 2004, entitled SYSTEM AND METHOD FOR EXTENDED MEDIA RETENTION, U.S. patent application Ser. No. 11/313,267, filed Dec. 19, 2005, entitled SYSTEMS AND METHODS FOR IMPROVED MEDIA IDENTIFICATION IN A STORAGE DEVICE, and U.S. patent application Ser. No. 11/313,256, filed Dec. 19, 2005, entitled SYSTEMS AND METHODS FOR CONTAINERIZED DATA STORAGE AND TRACKING.

BACKGROUND

Data storage systems interact with media libraries in data storage and retrieval operations. Media libraries house and control physical media (magnetic tapes, optical disks, and so on) that is used during storage operations, such as data backup operations. Libraries are limited in the number of media components they are able to hold, in many cases due to the physical size of the library. Therefore, a data storage system may need to transfer media components out of the library that are no longer needed or useful for data storage (e.g., media components at their storage capacity, or media components scheduled for offsite archiving), and bring in new media components for future storage operations.

Data storage systems may employ management systems to track the movement of media components to and from media libraries. Periodically, the systems transfer "full" or other media components to off site storage locations. Management systems may track the movement or location of media components used by a data storage system.

The management systems typically rely on policies that instruct the management systems as to the location of media components and the time at which to transfer media components to a determined location. However, the policies may be somewhat inflexible and lack insight into the needs of a data storage system or its policies, and therefore may instruct the library to perform undesirable media component transfers.

Additionally, libraries may look to similarly rigid policies when ordering new media components to be used in the system. Again, typical data storage systems, using rigid media component ordering and buying policies, typically do not achieve an optimum balance between the needs of a system and the number of media components coming into the system to meet those needs. Some media components are expensive, and thus ordering too many can be costly. Alternatively, it can be detrimental to the system if too few media components are available for a given storage operation job.

Furthermore, media management systems are not able to control all aspects of media component transfers. Media components are likely to be transferred to off site storage locations operated by other entities than an entity operating the data storage systems and media libraries. Also, media components are purchased from outside vendors. Therefore, the management of media components may stop or be severely limited once media components are not physically within or controlled by the system.

Some types of media, such as removable Universal Serial Bus (USB) drives, may be difficult to uniquely identify. For example, many USB drives do not contain a serial number or other identifier. Such media may also require additional human management. For example, unlike tape libraries, robotic systems for moving, loading, and tracking USB media are not generally available.

The foregoing examples of some existing limitations are intended to be illustrative and not exclusive. Other limitations will become apparent to those of skill in the art upon a reading of the Detailed Description below.

These and other problems exist with respect to media management systems.

Figure 1:
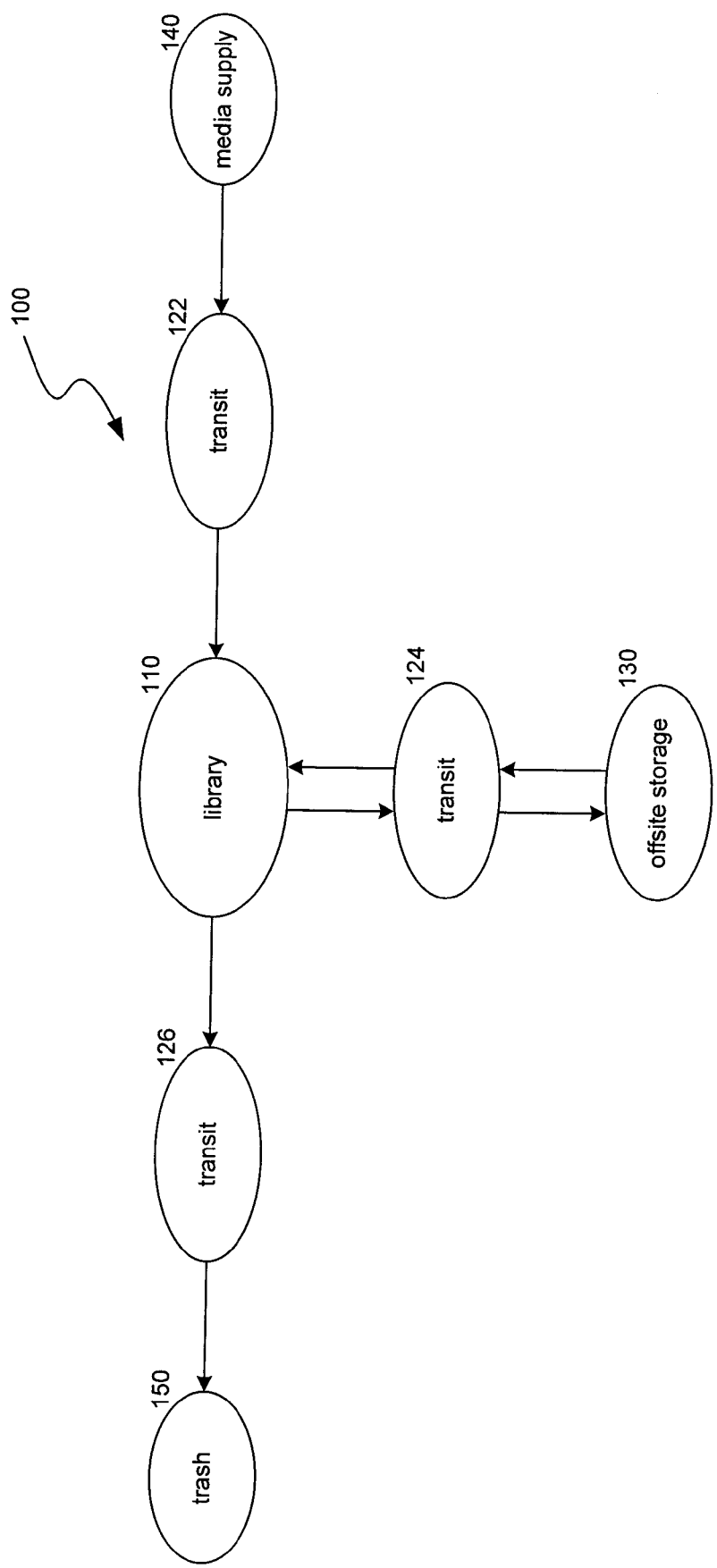
FIG. 1 is a block diagram illustrating an example of locations that house media components and the flow between such locations.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 110 is first introduced and discussed with respect to FIG. 1).

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology are concerned with systems and methods that manage, control, or facilitate the management or control of media to and from media storage libraries. Although described in connection with certain examples, the system described below is applicable to and may employ any wireless or hard-wired network or data transfer system that stores and conveys data from one point to another, including communication networks, enterprise networks, storage networks, and so on.

Examples of the technology are directed to systems and methods that consider the needs, characteristics, or other attributes of a data storage system in the management of media components in a media storage library. In some examples, the system may retrieve a media component from an off site storage location, transfer the media component to a media library, and provide a media library operator or automated library management system with information about the retrieved media component. In some examples, the system may consider the performance of a data storage system using the media library in determining how many media components to transfer into the media library. In some examples, the system verifies media components that are transferred into a media library from off site locations.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

A block diagram 100 illustrating some of the locations associated with media storage and the flow between such locations is shown in FIG. 1. In diagram 100, media components, such as magnetic tapes, optical disks, and other removable storage media, may be located in media library 110. Media library 110 may contain storage for multiple physical media and mechanisms (such as pickers, grippers, automated arms, and so on) that assist in handling and moving the media components around the library 110.

Figure 2:
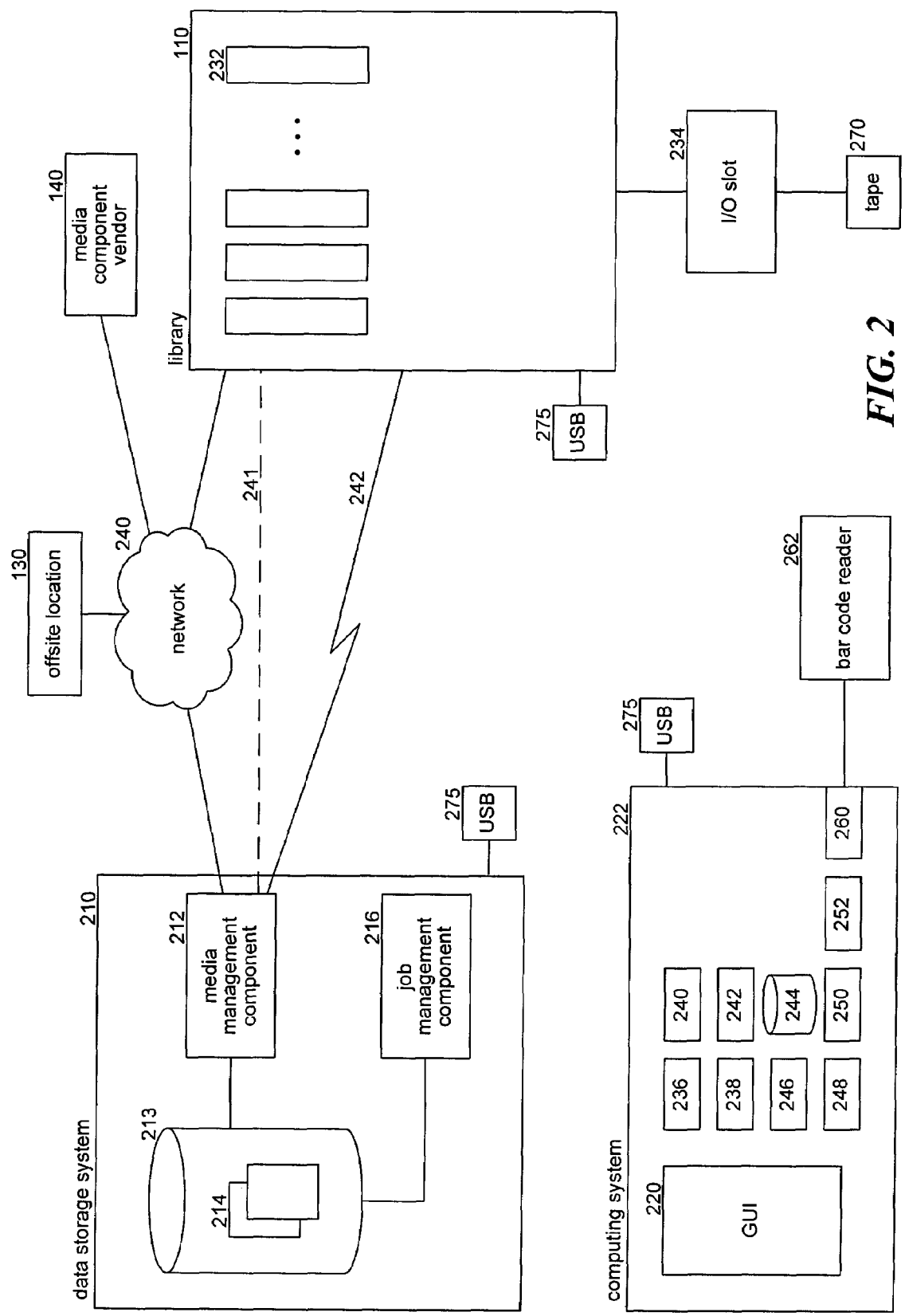
FIG. 2 is a block diagram illustrating an example of a data storage system.

Media components, such as tapes, may travel between media library 110 and any or all locations shown in FIG. 1. For example, the system may backup data to a media component, such as a magnetic tape, and schedule a transfer of the tape to offsite storage location 130. Such transfer to offsite storage may be performed for a variety of reasons. In this example, the system tracks the tape's location from the library 110 to when the tape is in transit 124, to the offsite storage location 130. Also, the system may track a tape from storage location 130 back to the library 110. Additionally, the system may track new media components from an outside supplier 140, to the library 110, or even in transit 122 from the outside supplier 140. Furthermore, the system may track media components as they leave the system 126 and are removed and either disposed, recycled, or otherwise destroyed at location 150. The assigned storage location can be any facility that stores or archives objects and the transit can refer to any method of moving the media component, such as a common courier, overnight delivery service, and so on. A block diagram illustrating an example data storage system is disclosed in FIG. 2. A data storage system 210 is connected to media library 110, and to a graphical user interface 220, such as an interface available via computing system 222. The data storage system may be a stand alone system or may be part of a complete data backup and storage system. The data storage system 210 may be connected to the library 110 via a fixed connection 242, a wireless connection 241, or via a network 240 (such as the Internet, a private LAN, and so on). Other system components may also interact with the data storage system 210 via the network 240, such as systems at off site storage locations 130, systems at tape vendors 140, and so on.

As discussed above, the library 110 may contain multiple media components 232, such as magnetic tapes, optical disks, USB drives, flash memory (or other solid state/semiconductor memory) drives, and so on. The library may also include or be connected to a receptacle or import/export slot 234, whereby media components, such as a tape 270, may be exported from the library or be received to be entered into the library. In some embodiments, media components may be manually added to or removed from the media library, such as by connecting or removing a USB drive 275. Alternatively or additionally, one or more USB drives 275 may couple to other systems, for example, to system 210, the computer 222, etc. While an automated library is generally discussed herein, aspects of the invention apply equally to other store systems, for example, direct attached storage (DAS), network attached storage (NAS), storage area networks (SAN), etc.

The data storage system 210, via the computing system 222, may comprise an administration component 238 and/or an automation component 236. An operator or administrator of the media library, via the computing system 222, may use components 236 and 238 to implement policies, verify media components within the library, or perform other management functions described below. The computing system may also include a verification system 260, comprising a scanner 262 or other automated data capture device (e.g. bar code reader/scanner, radio frequency identification (RFID) reader, audio recorder, etc.). The verification system will be discussed in greater detail herein.

Computing system 222 may be a personal computer or workstation, having one or more processors 240 coupled to one or more user input devices 242 and data storage devices 244. The computer is also coupled to at least one output device such as a display device 246 and one or more optional additional output devices 248 (e.g., printer, plotter, speakers, tactile or olfactory output devices, etc.). The computer may be coupled to external computers, such as via an optional network connection 250, a wireless transceiver 252, or both.

The input devices 242 may include a keyboard and/or a pointing device such as a mouse. Other input devices are possible such as a microphone, joystick, pen, game pad, scanner, digital camera, video camera, and the like. The data storage devices 244 may include any type of computer-readable media that can store data accessible by the computer 222, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 2).

In some cases, data storage system 210 contains a media management component 212, data files 214 stored in a database 213 or memory, and a job management component 216. The media management component may control the media used in backup operations, and also may control the exporting of media from the library or ordering/purchasing of media from an outside vendor. System 210 may use routines or other processes stored in data files when performing such controls or operations. Although not shown, the system may also control these functions, or part of these functions, within components 236 or 238 of computing system 222.

Figure 3:
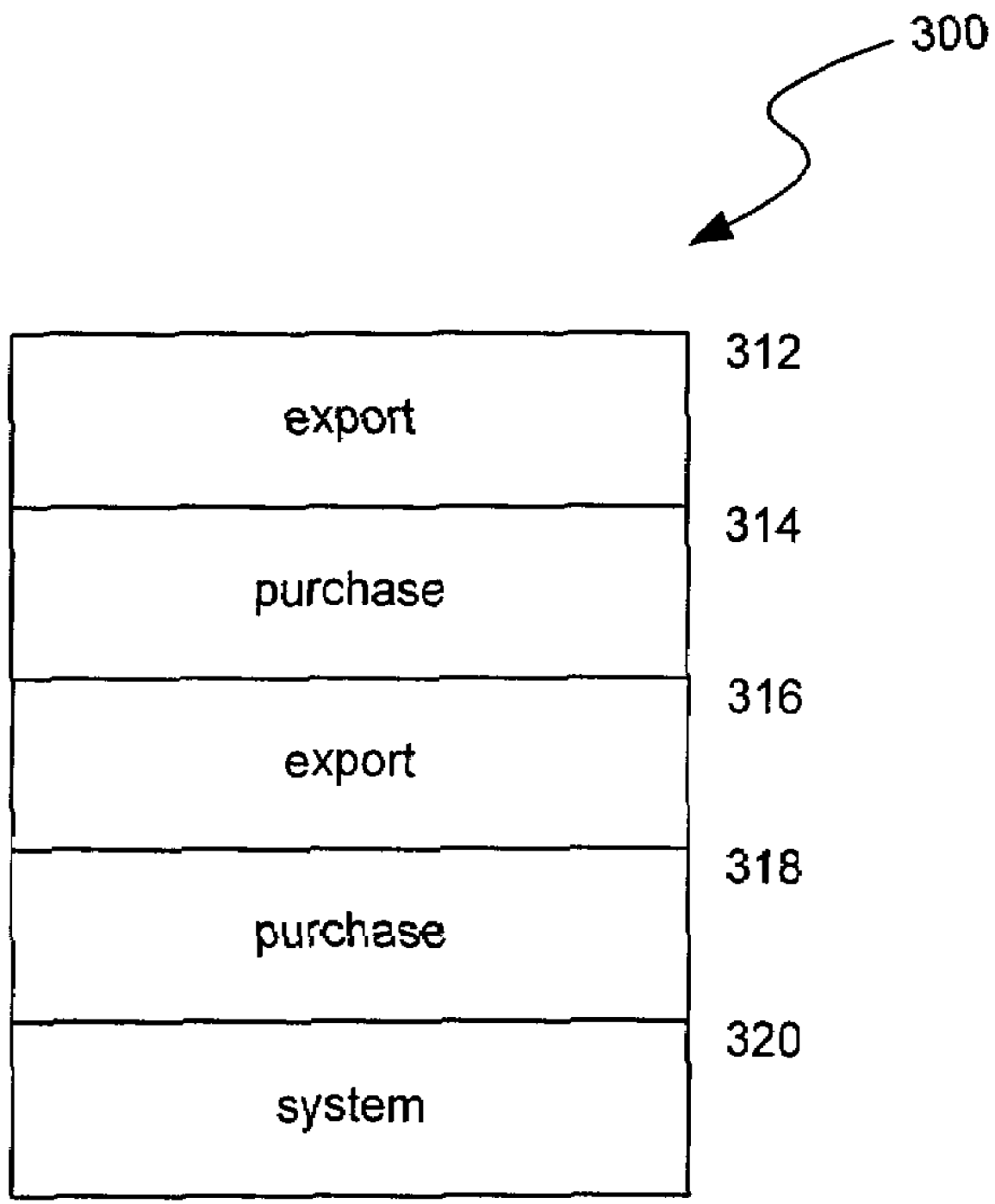
FIG. 3 illustrates an example data structure that may comprise examples of the system.

Data files 214 may be any typical data files, such as database files, relational database tables, flat files, and so on. FIG. 3 illustrates an example data structure 300. Data structure 300 may store data in fields or records 312-318, such as system wide data related to when media is to be exported 312, when media is to be purchased 314, where media is to be exported 316, how much media is to be purchased 318, when media is to be archived off site, when media is to be discarded, and so on. Additionally, data structure 300 may also store other system information 320, such as information related to why certain media components are in the library, information related to the history of backup operational performance, and so on. For example, data structure 300, or other similar data files, may store applications related to the routines illustrated in the below Figures.

While not shown, this data structure, or a separate one, may include data specific to a type of media component, such as a particular tape. Some media, such as the USB drives 275, lack specific serial numbers, and thus the system provides an identifier, such as a unique tracking number, with respect to each USB drive, as described below. As with the media management component, some or all of the data files may be stored within in the data storage system 210, the computing system 222, or both. Job management component 216 manages backup operations and other processes.

While the term "field" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Data structures may conform to conventions of object oriented programming and/or to other types of programming techniques. Any number of data structures and types can be employed herein.

Figure 4:
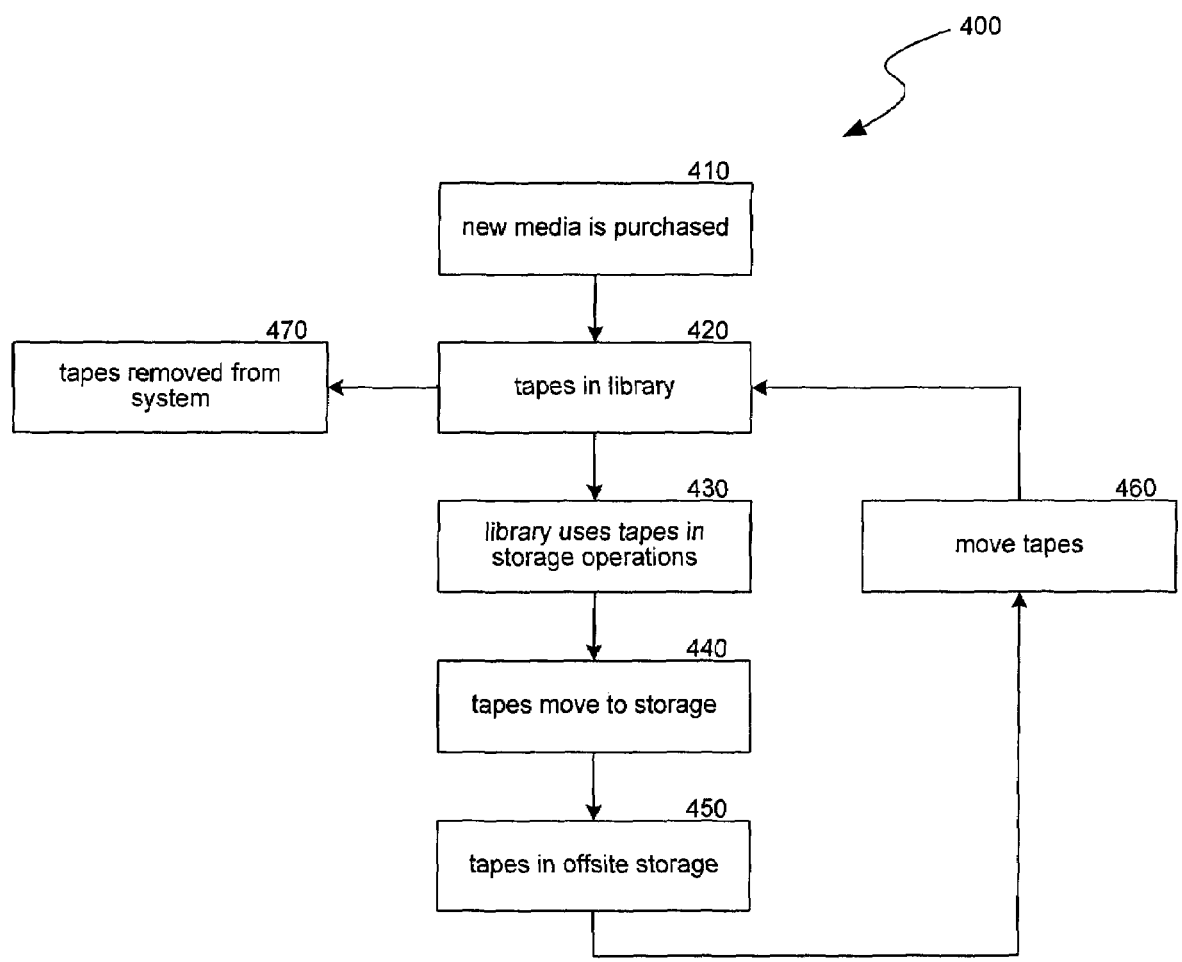
FIG. 4 is a flow diagram illustrating an example life cycle of a media component.

A flow diagram illustrating a life cycle of a media component is shown as routine 400 in FIG. 4. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

At step 410, the system purchases or receives a new media component. The media component may be, for example, a magnetic tape used to store backup information during a data backup operation. At step 420, the system transfers the newly purchased tape to a media library, such as media library 110. In step 430, the system performs backup or storage operations and writes data onto the tape. In step 440, after a certain predetermined delay, the system transfers the tape out of library 110 and to an off site storage location. In step 450, the tape remains in off site storage until needed by library 110, such as for a restore operation or during standard rotation of backup tapes. In these cases, in step 460, the tape is transferred back to library 110, and the system employs the tape as needed for storage operations. Once the storage operations are completed, the system transfers the tape back to the off site storage location. At a predetermined life cycle end for the tape, the system, in step 470, removes the tape from the system.

As discussed with respect to FIG. 4, a media component travels between many different locations during a component's life cycle. Implementing advanced management controls and functions, as discussed in greater detail below, allows a system or administrator to more effectively monitor and control media, further reducing errors, delays, or other problems that may exist in such data storage systems. In some cases, the effective management of life cycles of media components enables data storage systems to complete backup and/or restore operations within prescribed timelines (e.g., backup windows) and with fewer errors.

Recall Media Functions to Automate Archive Media Retrieval

As discussed above, the system may use information related to a media component before making decisions about exporting or recalling a media component.

Figure 5:
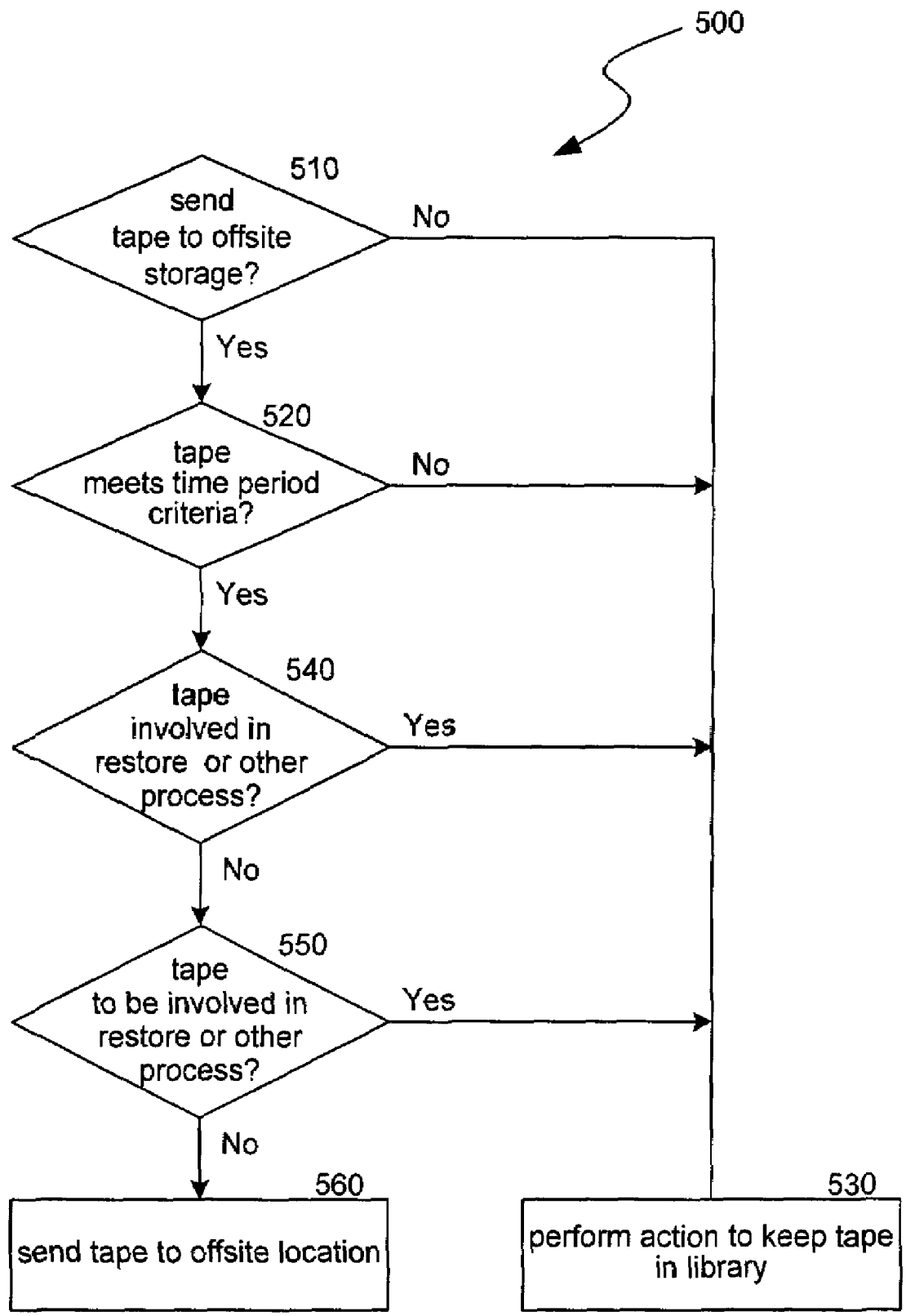
FIG. 5 is a process flow illustrating steps performed by the system before transferring media components out of a media library.

A process flow or routine 500 performed by the system 210 before transferring media components out of a media library is illustrated in FIG. 5. In step 510 of the routine 500, the system 210 (or user of the system, such as a system administrator) determines that a tape or other media component is eligible to be transferred out of library 110 to an alternate storage location, such as a location off site. At step 520, the system compares the age of the tape with predetermined time rules or policies. For example, the system may have a global policy of exporting all tapes over x months old out of the library to an off site location, or to an auxiliary media library. If the tape meets a time criteria, the routine moves to step 540, else the routine moves to step 530, and the tape remains in the media library. At step 540, the system looks to the use of the tape, and determines if the tape is involved in a restore or other process within the system. If the tape is not involved in any system processes, the routine moves to step 550, else the routine moves to step 530, and the tape is kept within the library. At step 560, the system reviews information regarding an intended use of the tape.

For example, the system 210 may have transferred or imported to the library 110 a tape received from the off site location 130 into the library in order to perform a restore operation using data from the tape. Often, the tape may be older than other tapes in the library (i.e., would meet the time criteria discussed above under step 520), and absent other knowledge, the system (or a system administrator) may transfer the tape back out of the library before a restore operation occurs. However, as shown in step 550, the system may review information related to the intended use of the tape and decide to keep the tape within the media library based on the information. In some cases, the information may be about the system's purpose for the tape (such as a restore operation). Alternatively or additionally, the information may be about the data contained on the tape.

Referring back to step 550, when the routine determines the tape is not involved in any processes, the routine proceeds to step 560, and the system transfers the tape off site. However, if the tape is involved in a process (or the system receives similar information), the system, at step 530, may perform an action to ensure the tape remains in the media library.

The system may send an alert to an administrator (such as to the administrator's email address) listing media not to be exported out of the library. Other alerts are of course possible, such as text messages, prerecorded voice messages, facsimile messages, and so on, all of which are encompassed within "alerts" or "messages" noted herein. In some cases, the system generates a report (such as a daily or weekly report) listing media not to be exported. The system may flag the media itself, such as providing an alert or indication to a media component's housing.

The system may also send an alert or message when transferring a tape. In such cases, the alert may indicate the reason for the transfer, or may contain other information that describes the content of the tape, the reason of the tape's location, the reasons for the timing of the transfer, and so on. The system may send an alert before transferring or recalling a tape, during, or soon afterwards. For example, the system may send an alert when the system transfers a tape from the library to an off site location, when system recalls a tape from the off site location to the library, when the tape transfers a tape from one library to another, and so on.

Figure 6:
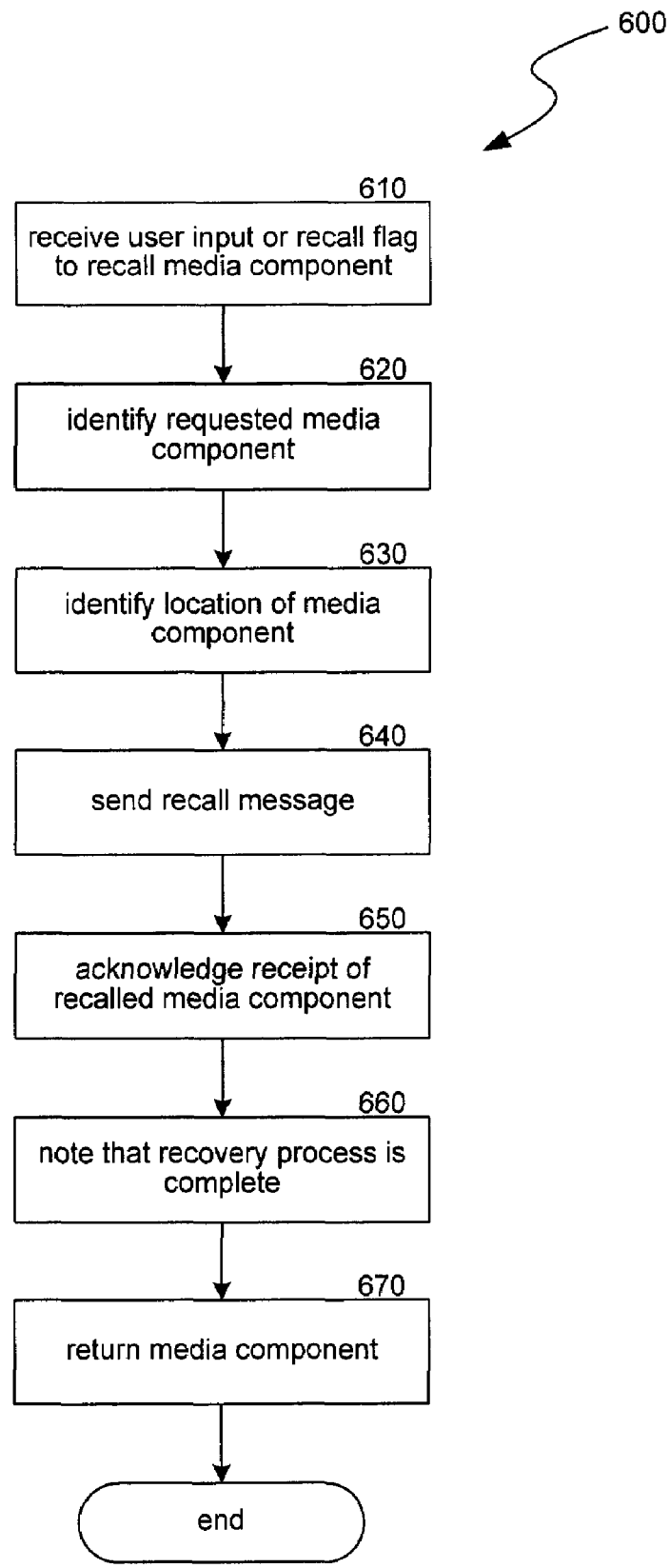
FIG. 6 is a process flow illustrating automatic recall and export of a media component.

Alternatively or additionally, the system may perform parts of life cycle 300 and routine 400 automatically. A process flow or routine 600 illustrating automatic recall and export of a media component is illustrated in FIG. 6. That is, the system 210 may perform some or all of the steps without the need for an administrator, or after a single input or action by the administrator.

For example, in step 610, the system receives a user input or other such information (e.g., automatically generated recall flag) indicating a need to recall a media component from an off site storage location. In step 620, the system may automatically identify the media component to be recalled (such as determine the media component's ID or serial number). The system, in step 630, may then automatically identify the location of the media component, such as from the appropriate data structure field stored in database 213. If the identified media component is at an off site location, the system, in step 640, may automatically send an email or other message to the appropriate off site storage location containing the media component. Once a media component is recalled, the system 210, in step 650, may automatically acknowledge receipt of or import in of the media component within the library 110 (as explained below). In step 660, the system may automatically note a recovery process using the media component has occurred or is complete, and, once the recovery processed has occurred, in step 670, automatically send the media component back to the off site storage location.

Alternatively or additionally, the system may automatically generate reports or other information to send with media components. For example, in step 670, the system may prepare a media component for shipment back to an off site media component storage facility. The system may automatically generate a report listing the tape, such as a report in a format desired by the storage facility and containing information desired by the storage facility. Also, the system may automatically generate a shipping label or other materials used in shipping the tape. The system may also automatically generate an alert to the storage facility indicating an incoming exporting of the tape. The system may also automatically alert a carrier to pick up the tape. In other words, the system may automatically generate and facilitate the preparation, shipping, and management of media components to be exported.

Automated Media Prediction, Ordering and Reporting

As discussed above, a system capable of understanding and/or predicting future data storage needs may be able to achieve greater levels of data storage accuracy, may complete storage operations more quickly, and/or may provide more efficient backup or restore operations.

Figure 7:
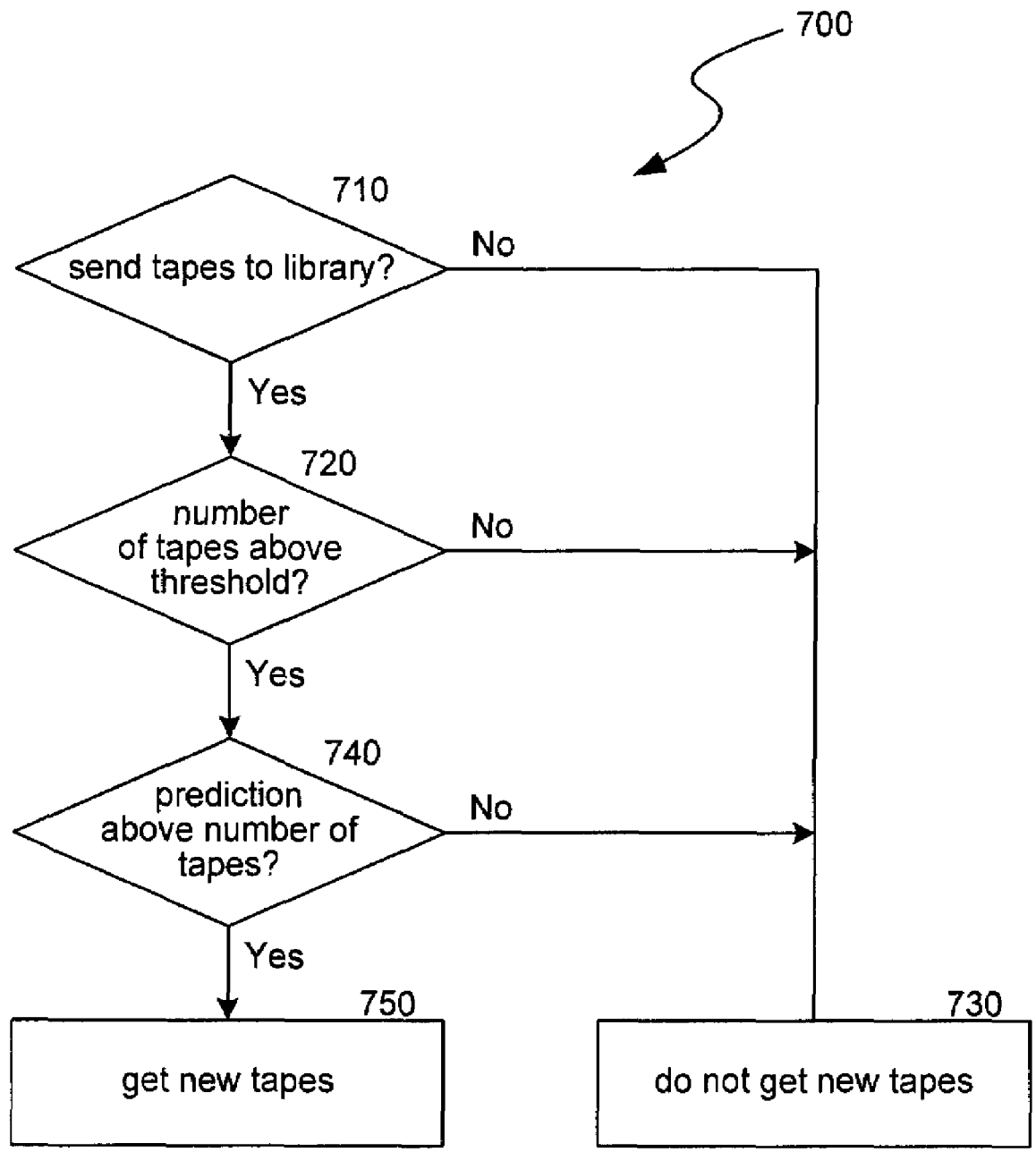
FIG. 7 is a process flow illustrating steps performed by the system in purchasing new media components.

A process flow illustrating a routine 700 performed by the system in purchasing new media components is described in FIG. 7.

In step 710, the system begins the routine 800 to determine a need to order and/or purchase media components (such as tapes) for a media library, such as media library 110. In step 720, the routine may look to the number of new or unused tapes already contained in the library, and if the number is above a predetermined threshold, proceed to step 740, else proceed to step 730. Alternatively or additionally, the system may skip step 720. In these cases, the system may have a policy that instructs the system to order a predetermined number of tapes, regardless of how many tapes are already contained in the library 110.

At step 730, the routine ends and new tapes are not purchased. At step 740, the system may look to characteristics of a data storage system employing media library 110, and determine that the number of tapes in the library 110 is below a number expected to be needed for future system operations.

For example, the system 210 may determine that there are ten unused tapes to be used in a backup operation to occur on the first Friday after the end of a company's fiscal year. Although the system generally uses eight tapes for Friday backup, the system may refer to the history of backup operations and determine that backup occurring soon after the end of the fiscal year generally use fifty percent more tapes than normal backup. Using this information, the system automatically determines that twelve tapes will be needed for the upcoming Friday backup, and orders two extra tapes. Therefore, using context information from the data storage system, the system may be able to avoid an unnecessary delay in backup operations due to a shortage of physical media.

Referring back to routine 700, at step 740, if the routine determines that enough tapes are in the library to satisfy a predicted need for tapes, the routine proceeds to step 730, and ends. If there are fewer tapes than predicted, the routine proceeds to step 750, and performs an action to purchase additional tapes.

The system 210 may perform actions in addition to these noted above. For example, the system, may alert an administration to purchase additional tapes (such as by sending an automatic, scripted email to the administrator's email address). Alternatively, the system may automatically order and/or purchase additional tapes, and may alert the administrator of any orders or purchases. The system may also automatically store any incoming (ordered or purchased) media components identifications, such as media component IDs, serial numbers, corresponding bar codes, and so on.

Additionally, the system 210 may update the history of backup operations after performing actions. The system may redefine rules or policies after one order, a number of orders, a predetermined pattern of orders, and so on. The system may alert an administrator when rules or policies are updated. Additionally or alternatively, the system may generate proposed rules or policies based on predicted ordering or purchasing behaviors. The system may then send an alert, report, or other notification to be approved by an administrator. In these cases, the system may be constantly monitoring and updating its policies with respect to the flow of new media components into the library.

The system 210 may look to a number of sources in predicting the number of media components likely to be needed in storage operations. For example, the system may look to context information such as calendar or historical information, user information (such as company history information), and so on. The system may look to recent backup operational information (such as information related to trends in recent media component needs), may look to error information (such as information describing failed or erroneous backup operations), may look to global trend information about backup operations performed at a number of different and separate data storage systems, and so on.

Retrieved Media Verification and Confirmation Systems

Referring back to FIG. 2, computing system 222 (or, alternatively, data storage system 210) may also contain a verification system 260 that checks and verifies media components as they enter (or exit) the media library 110. For example, the verification system 260 may contain a hand held bar code reader 262 or other type of data capture device that identifies entering media components (such as by scanning a bar code on the media component). The verification system 260 may then look to a report or other file (such as an emailed list of requested media components) that lists requested media components and verify that the media component is on the report. If the media component is not on the report, the verification system may perform an action to determine the proper location for the media component. The verification system may automatically verify entering media components, or a media library administrator may perform the verification, such as with scanner or reader 262.

Figure 8:
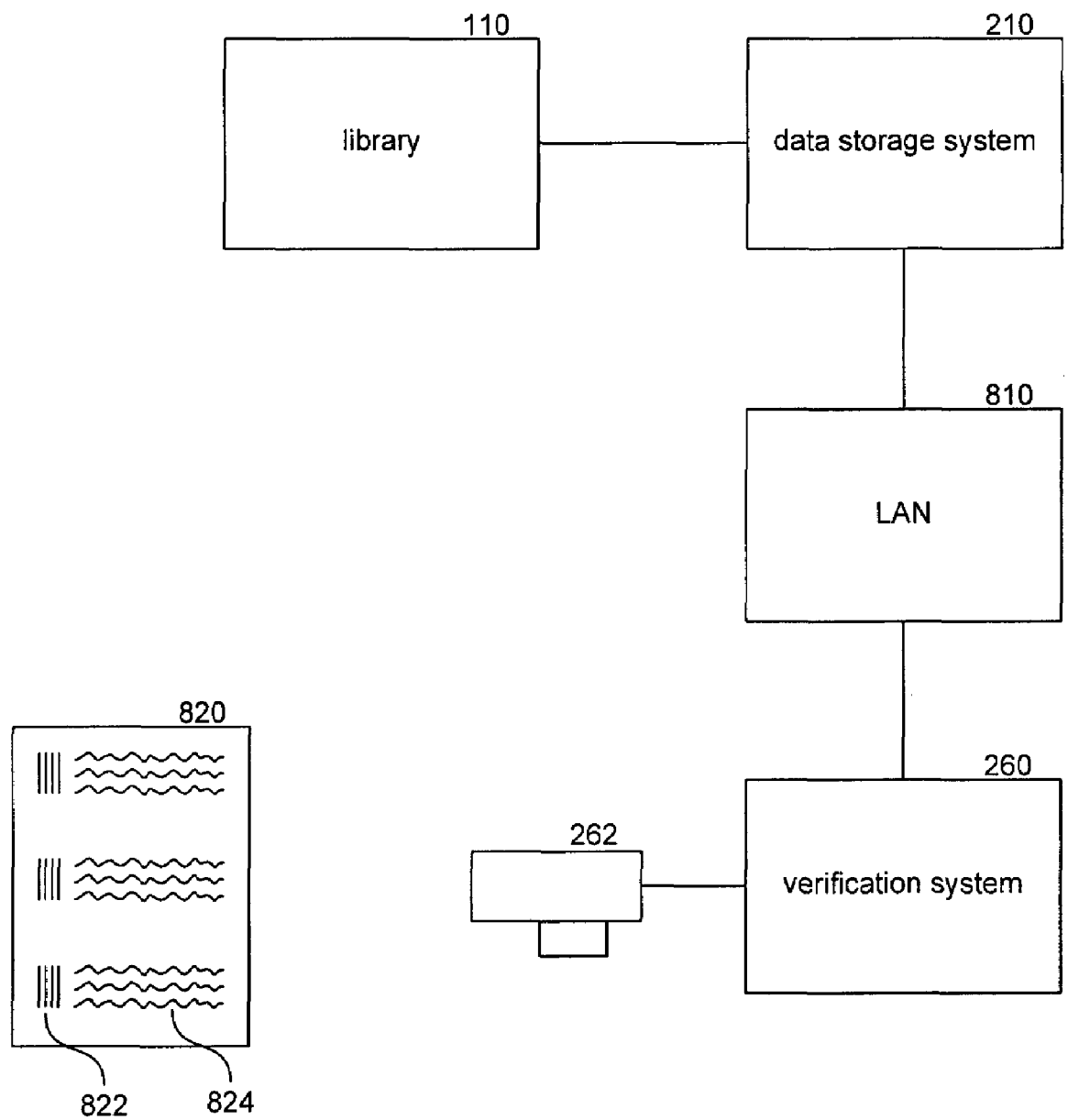
FIG. 8 is a block diagram illustrating components of a system for verifying recalled or exported media components.

A block diagram illustrating components of a system for verifying recalled or exported media components is shown in FIG. 8. The system may be wirelessly connected to library 110 and the data storage system 210 via a LAN 810 or other network, although a wired connection may be employed. The verification system 260 may include a scanner 262, such as a bar code scanner in this example. The bar code scanner may be used with a media component report, such as report 820 illustrated in FIG. 8. The report 820 may contain machine readable information 822 (such as bar codes, media IDs, or other machine readable indicia or devices (like RFID tags)) and human readable information 824 (such as descriptions of media components). An administrator may use the scanner 262 to obtain information from the report 820 via the bar codes 822. Further details with respect to verifying media components are discussed with respect to FIG. 9.

Figure 9:
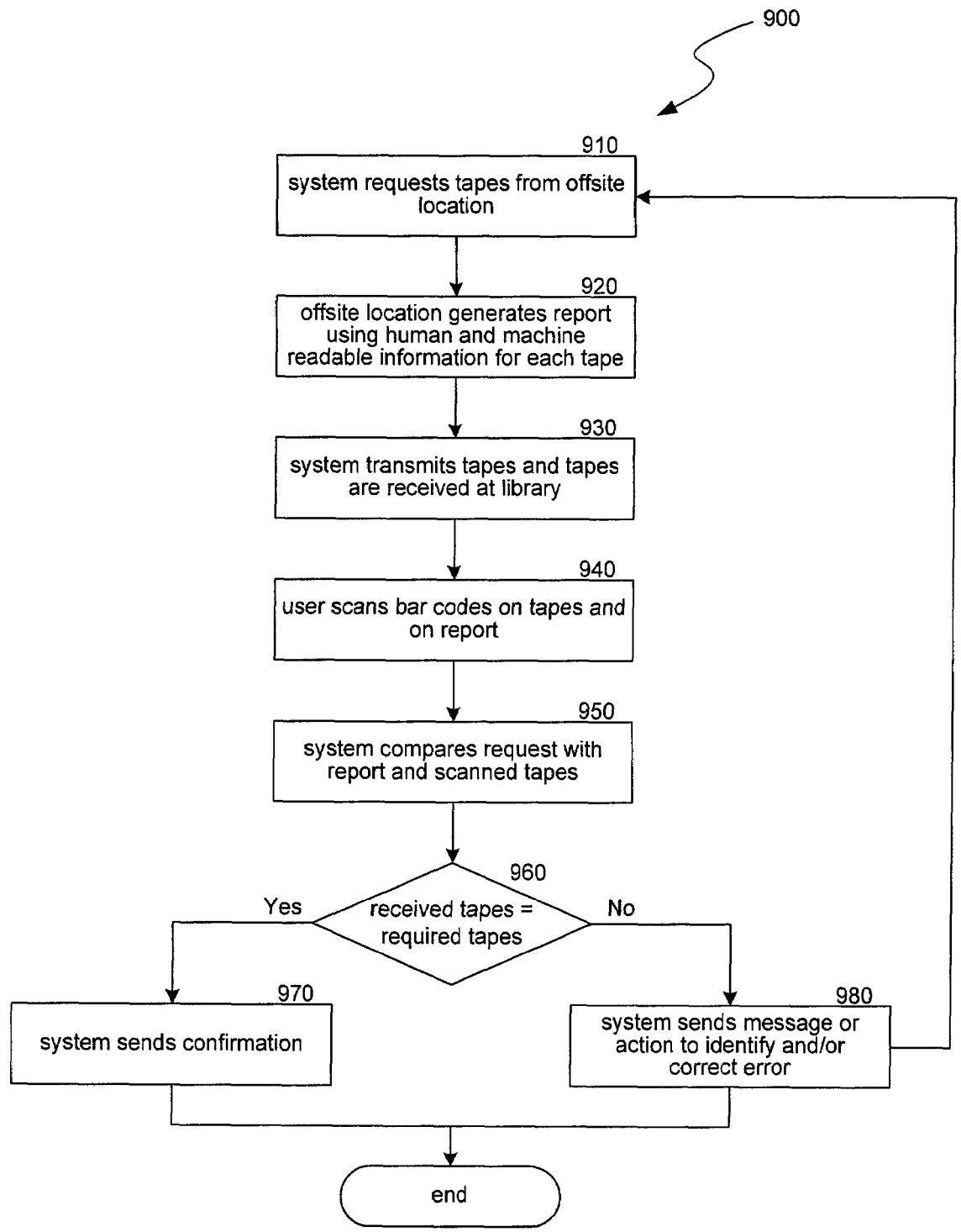
FIG. 9 is a flow diagram illustrating a routine for verifying recalled media components.

A flow diagram illustrating a routine 900 for verifying recalled media components is shown in FIG. 9. In step 910, the system may request media components (such as tapes) from an off site storage location (such as a media storage facility). Before sending tapes to the system, in step 920, the off site location may generate a report 820 containing machine readable information 822 and human readable information 824 for the tapes. Alternatively or additionally, the report may only contain the human readable information 824, and the system may generate a machine readable report using the information 824. Also, the system may generate a report when requesting media components. The system, in step 930, receives the requested tapes and corresponding report 820. In step 940, the system, via an administrator, scans barcodes on the tapes and barcodes 822 on the report 820 (or on a system generated report). Alternatively or additionally, the system may import the tapes to the library and a component of the library may scan the tapes.

In step 950, the system compares the scanned bar codes from the requested tapes with the scanned bar codes of a corresponding report. In step 960, the system determines if the received tapes are the same as the tapes contained in the report. If the tapes are the same, the routine 900 proceeds to step 970, else to step 980. In step 970, the system may send a confirmation message or other alert, and end. In step 980, if the system determines that the comparison of requested tapes to recalled tapes (or, of the received tapes to the tapes listed on a corresponding report), the system may send a message or perform an action identifying the error and/or requesting a correction.

The system, in step 980, may automatically request an off site location to correct a tape request. The system may send information related to the comparison in step 960. For example, if the system receives ten tapes from Iron Mountain, and eleven tapes are listed on an accompanying report, the system may automatically transmit a request for the missing tape. The request may include information related to the verified ten tapes and the one missing tape. The system may also transit a message requesting a refund for an erroneous shipment, or may request a future credit. Additionally, should a received tape not be a tape requested by the system, the system may automatically generate shipping materials and may automatically alert a carrier to ship the tape back to the off site storage location.

In some cases, the system may verify the accuracy of a shipment of newly purchased tapes. The system may compare received tapes with an invoice, report, or other accompanying documentation, and determine the accuracy of the shipment, as described in step 960. If there is a discrepancy, the system may alert a vendor of the tapes to send any missing tapes, to request a refund, to request additional tapes, and so on. The system may gather data from a common courier to track locations of tapes in transit and provide a graphical user interface to depict currently reported locations of tapes in transit.

In some cases, the system described above may be used with respect to recalling and exporting data, in place of media components that store data. For example, in a recall operation, an off site storage location may operate by reading data from one of the stored tapes and only transfer the read data (such as electronically transfer) to the library 110 or directly to the data storage system 210. In these cases, the system may recall large amounts of electronic data, and store such data in a large buffer or other readily accessible storage. However, storing large amounts of recalled data may compromise the local disk space of a data storage system and the system may experience similar problems as those discussed above. Therefore, the system may use the methods described above to similarly make decisions with respect to the export and recall of data as well as media components that store data.

Removable Storage Devices

Many types of media include unique identifiers or serial numbers that help track that media throughout the system. However, certain removable storage devices, such as removable USB drives, flash memory drives, and so forth, may lack such a unique identifier. Thus, in some embodiments, the data storage system generates an identifier for removable media that does not already contain a unique identifier. For example, one type of identifier is an on-media label (OML). The OML may be stored on the drive as data, a user may be prompted to write the OML on the outside of the drive, or both. The OML may also contain additional information, such as a hash value that identifies the drive. For example, when the system 210 first detects a new USB device 275, the system provides certain data such as the creation time when the drive was first added to the media library, and one or more screens to prompt the user to input other data, such as a friendly name for display to a user, or other information. A friendly name could be, for example, a text string that is easy for a user to remember, such as "Joe's Removable Disk." When the media is needed, the data storage system may prompt the user by displaying the friendly name in a request to the user, for example, "please insert Joe's Removable Disk." Other information that may be stored and/or requested, can be a password or key value, owner/location that indicates an origin of data to be stored on the device or who is responsible for the device (such as a department within a company), type of compression/encryption, dates for archiving, disposal or other lifecycle management dates, and so forth. In some embodiments, other information may be used as a seed to produce a unique identifier, such as the time of day that the device is first introduced to the system or the MAC address of the network card of a computer that first identifies the device. Those of ordinary skill in the art will recognize that common principles of digital rights management (DRM) can be applied in generating a unique identifier.

As explained below, when a removable device (or drive) is inserted, the media library determines if the drive has been seen before, either automatically by reading the OML stored on the device or by prompting a user to enter the OML from the outside of the drive. The media library may contain information about each removable device as well as access control information that determines how the device may be used. For example, the access control information may specify that unknown devices cannot be used to store backup data, or that data cannot be copied from an unknown device to other storage devices tracked by the media library. The access control information may also specify what types of backup data can be stored on the device. For example, keywords may be used to prevent data containing the word "confidential" from being backed up to a USB drive.

Figure 10:
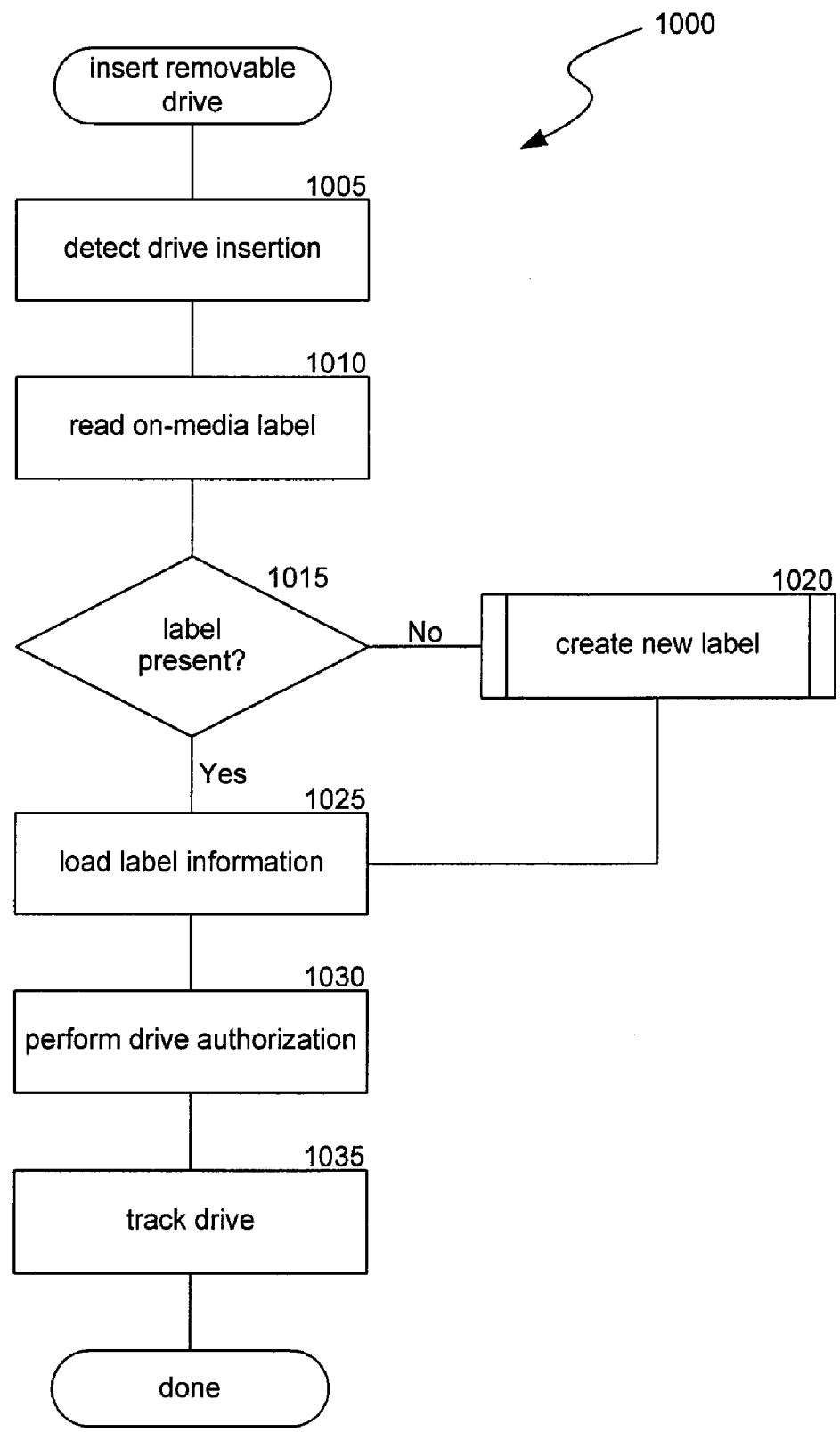
FIG. 10 is a flow diagram illustrating an example of using USB media.

A flow diagram illustrating a routine 1000 for handling removable media is shown in FIG. 10. In step 1005, the system 210 detects the insertion of a removable media drive. For example, the system may be informed by an operating system that a USB drive has been inserted. In step 1010, the system attempts to read the on-media label or other identifier of the removable drive. The system may read the on-media label stored on the drive itself, or may prompt the user to input an on-media label written on the outside of the media. In step 1015, if an on-media label was found, then the system continues at step 1025, else the routine continues at step 1020.

In step 1020, the system 210 creates a new on-media label. For example, the system may refer to a store table that lists sequentially numbered on-media label values for previously established removable drives, and then simply generates the next sequential on-media label value for the new drive. Alternatively or additionally, the system may prompt the user to input an on-media label, which the system checks to confirm is not duplicative of any on-media label values already existing within the system. In an alternative embodiment, the system randomly generates an on-media label value, and again confirms that the randomly generated value is not duplicative of any existing values before applying the value to the new drive. Further, as described below, the drive itself may be used to uniquely generate an on-media label for that drive based on unique physical characteristics of the drive.

In step 1025, the system loads information related to the on-media label, such as the creation time, friendly name, and access control information associated with the drive. In step 1030, the system performs any steps related to authorizing the drive for desired actions based on the access control information associated with the drive. Various processes may be employed in step 1030 such as requesting and checking a password associated with the user or the particular removable drive, determining whether the user has appropriate privileges with respect to that drive, whether operations being requested for that drive are permitted (e.g., read privileges may be permitted, but not write), and so forth. Further, the system 210 may analyze data stored on the removable drive, index that data, and then compare an index of that data with certain keywords stored on the system. For example, the system may store one or more lists of words associated with privileges for one or more users, departments/groups, or individual drives such that if any of the words are found stored on the drive, then the system may prohibit or restrict one or more operations or privileges. Some simple examples are where base users may not view any documents containing the words "confidential," where only certain officers or executives of a company may view documents including the name of a particular customer or target company to be purchased, only particular individuals or departments (such as human resources) can access documents having terms (or metadata tags) representing personnel records, and so forth. The system 210 may perform additional initial steps associated with step 1030. For example, the system 210 can compare a date on the drive with a last tracked date stored by the system 210 to determine that the drive contains new data that needs to be copied from the drive. The system 210 may also store a last size of the data on the removable drive and compare this value to the drive's current size to determine that new data has been written to the drive. As another example, the system 210 may move data from the drive to another location once the drive has reached a threshold amount of data or a certain percentage of the drive's capacity.

In step 1035, the system 210 may then track the removable drive. For example, the system may track the drive as generally described above, so as to facilitate recall functions associated with the removable drive, to facilitate automated media prediction, ordering and reporting, as well as to facilitate retrieved media verification and confirmation. For example, the system 210 may determine that the drive is almost full and place an order for additional drives. The system may also generate a report for an administrator, such as a report indicating how much of a company's data is stored on removable media. Following step 1035, the routine ends.

The system may also generate an OML automatically, using characteristics of the device itself. For example, the location of bad blocks on the device can be used as a unique identifier for the device. It is common for storage devices to have several bad blocks. The location of the bad blocks varies from device to device, such that it is very rare for two devices to have the same number and layout of bad blocks. The location of the bad blocks may also act as an input to a hashing function or other mechanism to generate an identifier for the device.

Another example is a memory device in which some blocks may be identified as unused or bad. It is common during fabrication of hardware components having several identical subcomponents for some subcomponents to fail to function correctly. The percentage of subcomponents that function correctly is generally referred to as yield, which is rarely 100 percent. Therefore, hardware components are often fabricated with more subcomponents than necessary to ensure that a needed number of subcomponents function correctly. Following fabrication, subcomponents that do not function correctly may be identified as inactive. Subcomponents can be identified as inactive by setting certain values in firmware or by blowing one or more electronic fuses (sometimes called e-fuses or anti-fuses). For example, a one gigabyte flash memory drive may be composed of 10 one-hundred megabyte memory modules. However, the flash memory drive may be fabricated with 12 one-hundred megabyte memory modules, such that two of the one-hundred megabyte memory modules can be deactivated to account for poor yield. The configuration of activated and deactivated subcomponents can be used to generate a unique identifier for the device.

Figure 11:
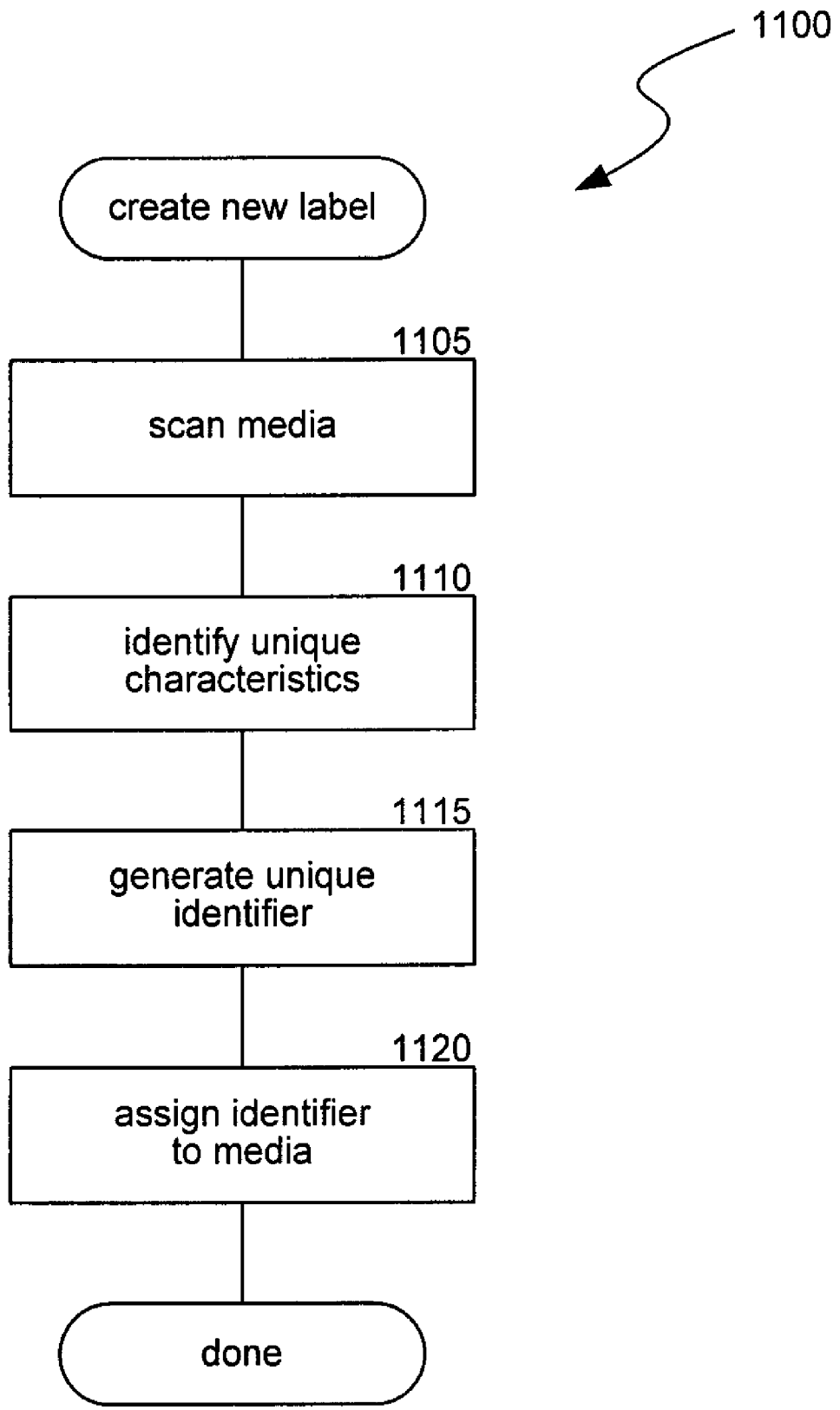
FIG. 11 is a flow diagram illustrating an example of automatically generating a device identifier based on characteristics of the device.

A flow diagram illustrating a routine 1100 for generating an OML automatically based on device characteristics is shown in FIG. 11. In step 1105, the system 210 scans the media, such as after it is first connected to the system 210, to determine the available device characteristics. In step 1110, the system 210 identifies unique characteristics of the media, such as the number and layout of bad blocks on the media or hardware subcomponents of the media that are deactivated. In step 1115, the system 210 generates a unique identifier based on the identified characteristics of the media. For example, the layout of bad blocks may be used as input to a hashing function to produce a unique value that identifies the media. Seed values may also be used as input to the hashing function, such as the time of day. In step 1120, the system 210 assigns the generated identifier to the media. Following step 1120, the routine ends.

Referring to FIGS. 12A through 12G, representative computer displays or web pages will now be described with respect to removable storage devices. The screens of FIGS. 12A through 12G, and screens discussed below, may be implemented in C++ or as web pages under XML (Extensible Markup Language), HTML (HyperText Markup Language) or any other scripts or methods of creating displayable data, such as the Wireless Access Protocol ("WAP"). The screens or web pages provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page," and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the system are described herein using a networked environment, some or all features may be implemented within a single-computer environment.

Figure 12A:
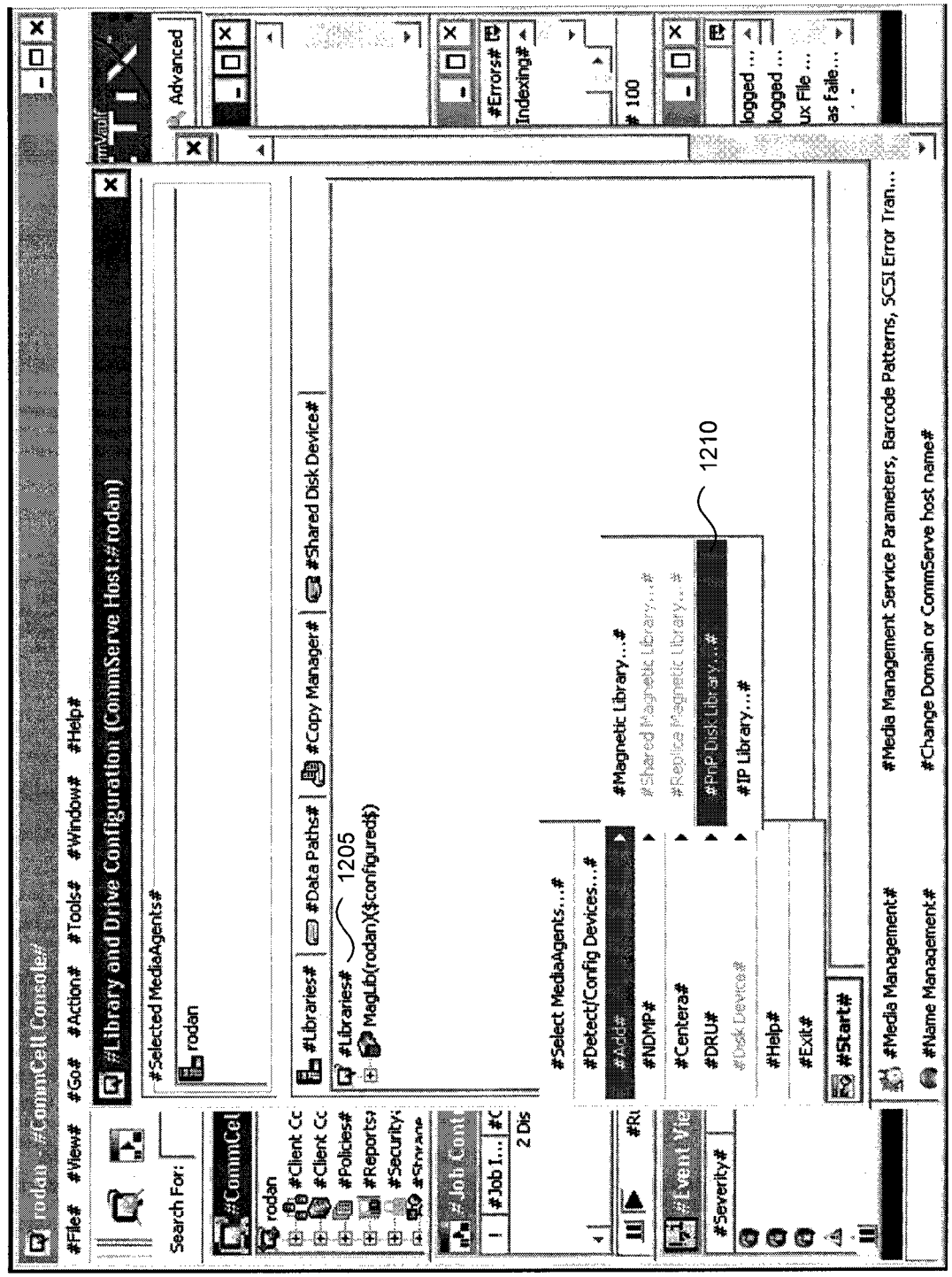
FIGS. 12A-12G illustrate representative computer displays or web pages displayed by the system in some embodiments.
Figure 12B:
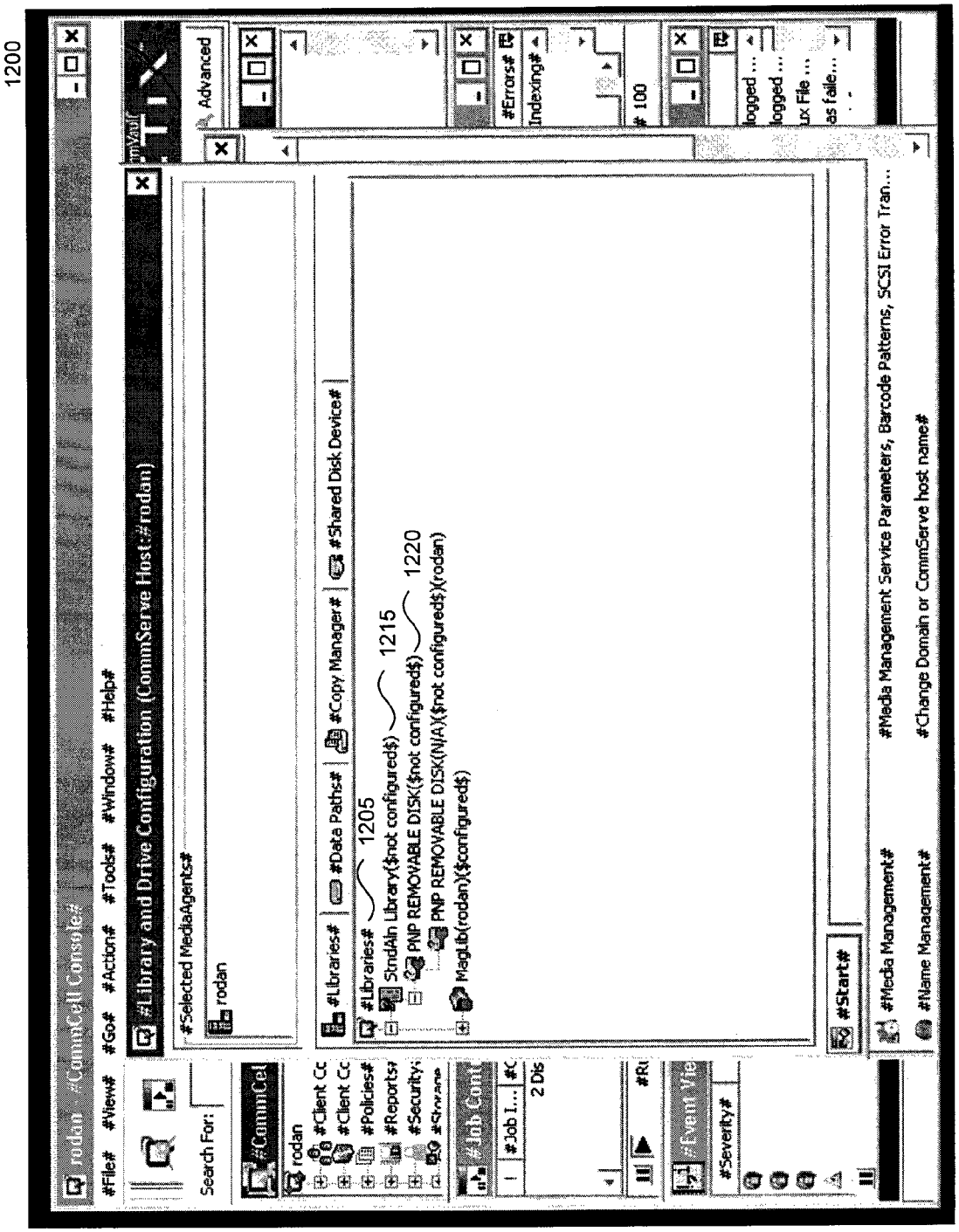
Figure 12C:
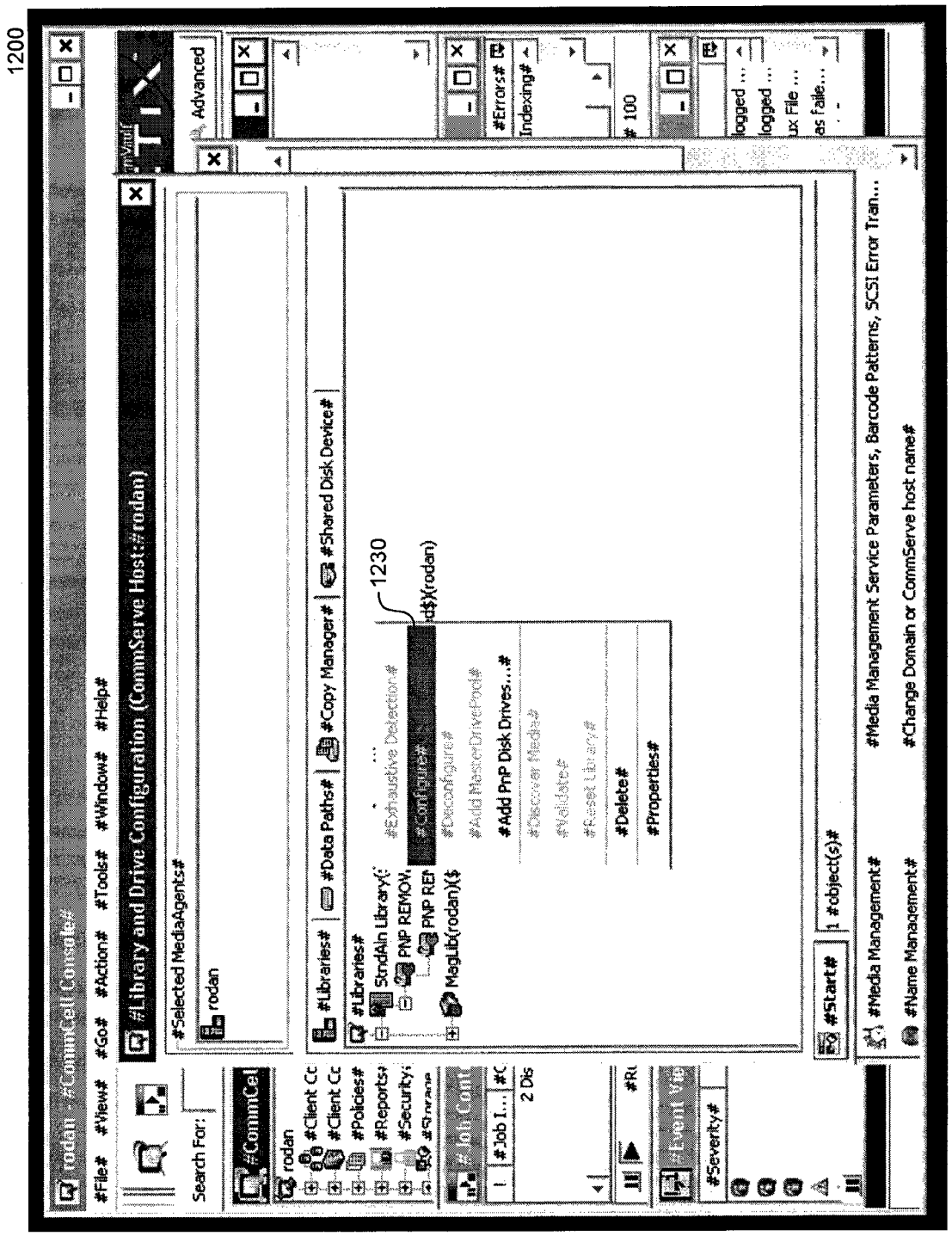
Figure 12D:
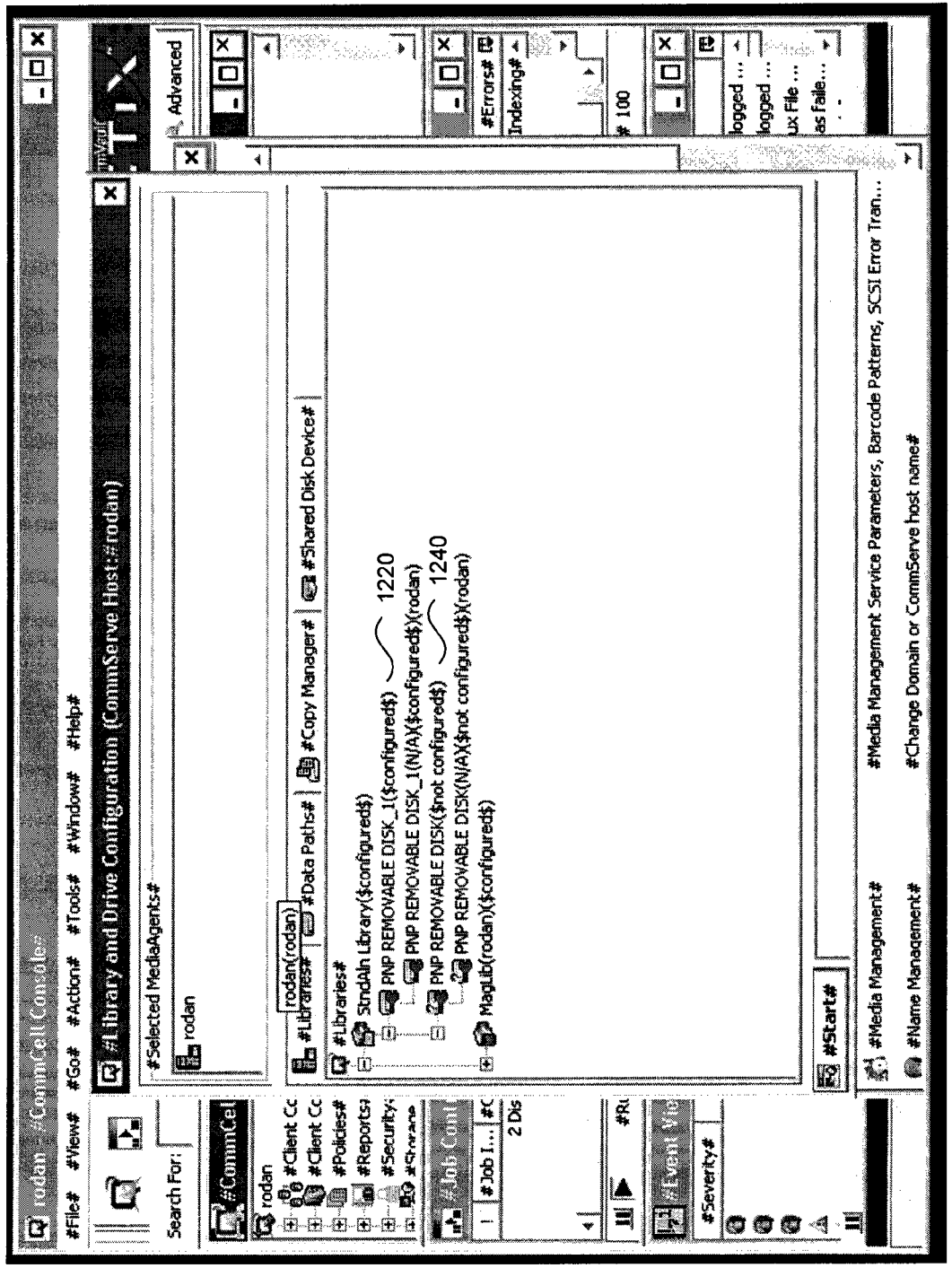

FIG. 12A illustrates a display 1200 generated by the system 210. The display 1200 contains a list of libraries 1205 and an option 1210 to add a new plug and play disk library. A plug and play (PnP) disk is one type of removable storage device. FIG. 12B illustrates the display 1200 after a new removable disk has been added. The new disk 1220 is associated with a library 1215 in the list of libraries 1205. FIG. 12C illustrates a configuration option 1230 for configuring the new disk. Additional removable disks can be added to the library, as illustrated by FIG. 12D. FIG. 12D contains the first removable disk 1220, and a second removable disk 1240 added to the library.

Figure 12E:
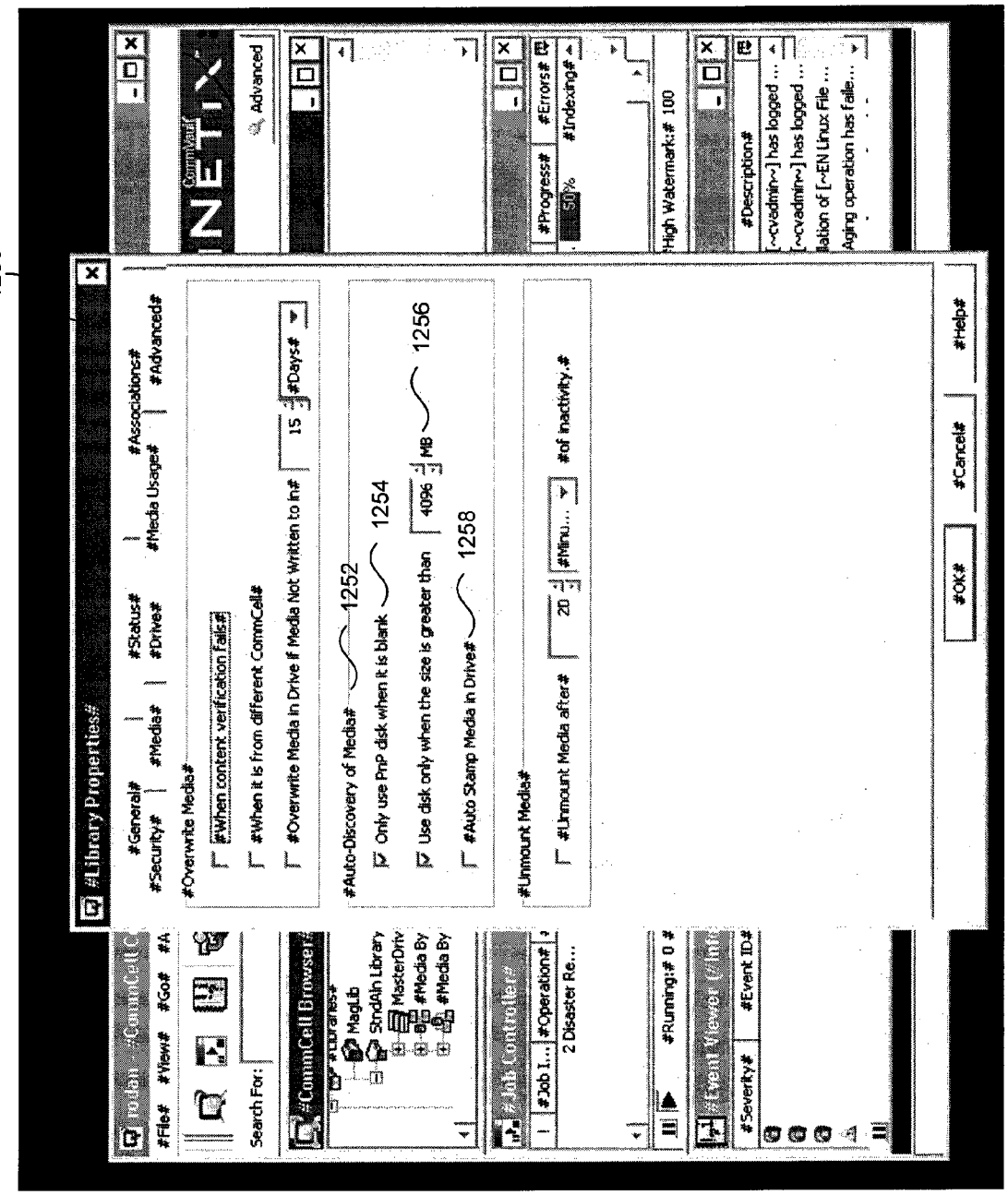

FIG. 12E illustrates a properties dialog box 1250 containing some of the configuration properties associated with a library. The properties dialog box 1250 contains a group of controls 1252 for configuring media. For example, the group of controls 1252 contains a checkbox 1254 that when selected will only allow blank media to be used with the library. The group of controls 1252 also contains a checkbox 1256 that when selected will only allow media greater than a threshold size to be used with the library. The group of controls 1252 also contains a checkbox 1258 that when selected will automatically associate an identifier with new removable media placed in a drive associated with the library.

Figure 12F:
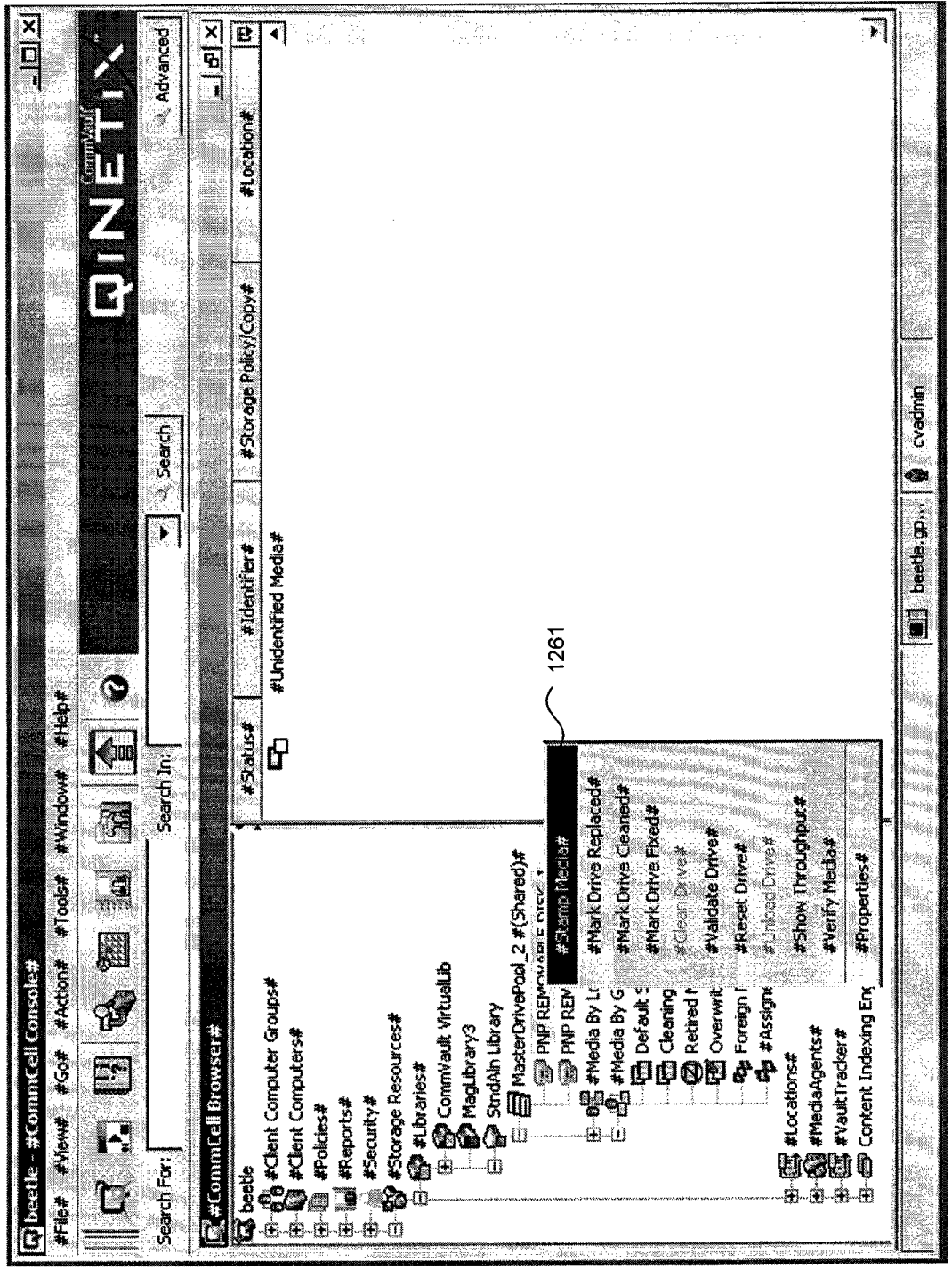
Figure 12G:
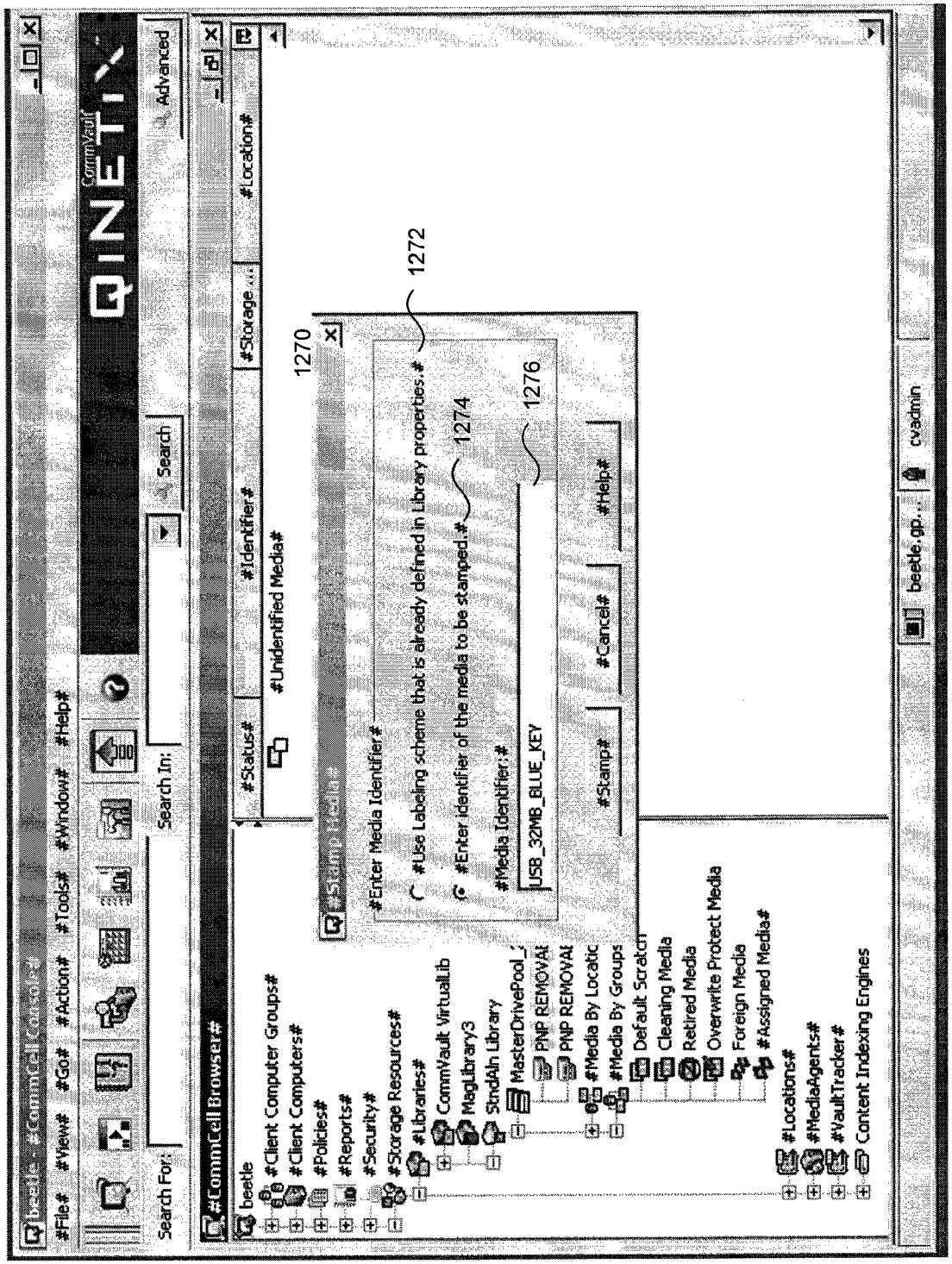

FIG. 12F contains a display 1260 illustrating operations available for interacting with a new removable disk drive. For example, one option 1261 is to stamp the new media with a label identifying the media to the system 210. FIG. 12G illustrates a stamp media dialog box 1270 that is presented to the user when the stamp media option 1261 is selected. The stamp media dialog box 1270 contains an option 1272 that when selected will generate an identifier based on a labeling scheme defined in the properties for the library (e.g., under one of the methods noted above). The stamp media dialog box 1270 also contains an option 1274 that when selected allows the user to enter an identifier to be associated with the removable disk. The user enters a media identifier in the edit box 1276.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multiprocessor systems, microprocessor-based or programmable consumer electronics, set-top boxes, network PCs, minicomputers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:
1. A method for generating an identifier for uniquely identifying a removable storage device, the method comprising:
identifying one or more characteristics of the removable storage device, wherein the removable storage device does not contain an electronic serial number provided by a manufacturer of the removable storage device;
selecting characteristics that are substantially unique for the removable storage device;
generating an identifier for the removable storage device based on the selected characteristics, such that the identifier is substantially unique,
wherein the identifier for the removable storage device is not a digital picture of the removable storage device, and wherein the identifier for the removable storage device is not fixed to packaging of the removable storage device; and storing the identifier for the removable storage device as data in memory within the removable storage device such that the removable device can be automatically recognized each time the removable storage device is accessed.

2. The method of claim 1 wherein generating an identifier comprises receiving a user-provided unique identifier for the removable storage device.

3. The method of claim 1 wherein generating an identifier comprises creating a hash including a device model identifier and a seed value.

4. The method of claim 1 wherein generating an identifier comprises identifying the owner of the removable storage device.

5. The method of claim 1 wherein generating an identifier comprises identifying a department associated with the removable storage device.

6. The method of claim 1 wherein generating an identifier comprises identifying the MAC address of the computer used to generate the identifier for the removable storage device.

7. The method of claim 1 wherein generating an identifier comprises identifying the computer on which the removable storage device was first used.

8. The method of claim 1 wherein generating an identifier comprises identifying the time at which the removable storage device was first used.

9. The method of claim 1 wherein generating an identifier comprises identifying the location and number of bad blocks on the removable storage device.

10. The method of claim 1 wherein generating an identifier comprises identifying deactivated subcomponents of the removable storage device.

11. A system for generating an identifier for uniquely identifying a removable storage device, the system comprising:

a characteristic identification component configured to identify one or more characteristics of the removable storage device, wherein the removable storage device does not contain an electronic serial number when manufactured;

a characteristic selection component configured to select characteristics that are substantially unique for the removable storage device;

an identifier generation component configure to generate an identifier for the removable storage device based on the selected characteristics, such that the identifier is substantially unique, wherein the identifier for the removable storage device is not a digital picture of the removable storage device wherein the identifier for the removable storage device is not fixed to packaging of the removable storage device; and an identifier association component configured to store the identifier for the removable storage device in memory within the removable storage device such that the device can be automatically recognized when the removable storage device is coupled to a computing device.

12. The system of claim 11 wherein the identifier generation component identifies the location and number of bad blocks on the removable storage device to generate an identifier.

13. The system of claim 11 wherein the identifier generation component identifies deactivated subcomponents of the removable storage device to generate an identifier.

14. A computer-readable medium containing instructions for controlling a computer system to generate an identifier for uniquely identifying a removable storage device, by a method comprising:

identifying one or more characteristics of the removable storage device, wherein the removable storage device does not contain an electronic serial number when it leaves a manufacturer;

selecting characteristics that are substantially unique for the removable storage device;

generating an identifier for the removable storage device based on the selected characteristics, such that the identifier is substantially unique; and storing the identifier for the removable storage device as data in memory within the removable storage device, wherein a computer reading data from the removable storage device can automatically recognize the removable storage device each time the removable storage device is read from or written to based at least in part on the identifier for the removable storage device stored as data in memory within the removable storage device.

15. The computer-readable medium of claim 14 wherein the removable storage device is a universal serial bus (USB) disk drive.

16. The computer-readable medium of claim 14 wherein the removable storage device is a magnetic disk drive, and wherein the identifying comprises identifying bad sectors or portions on the magnetic disk drive.

17. The computer-readable medium of claim 14 wherein the removable storage device is a semiconductor memory drive, and wherein the identifying comprises identifying bad memory cells, enabled redundant memory cells, or both.

18. The computer-readable medium of claim 14 wherein generating the identifier for the removable storage device includes performing a hashing function.

19. The computer-readable medium of claim 14 wherein generating the identifier for the removable storage device includes algorithmically combining one or more identified locations or addresses for defects of the device with known data to generate the identifier.

20. The computer-readable medium of claim 14 wherein generating the identifier for the removable storage device comprises determining the capacity of the removable storage device.

* * * * *

UNITED STATES PATENT AND TRADEMARK OFFICE
CERTIFICATE OF CORRECTION

PATENT NO. : 7,539,783 B2 Page 1 of 1
APPLICATION NO. : 11/694803
DATED : May 26, 2009
INVENTOR(S) : Jaidev O. Kochunni et al.

It is certified that error appears in the above-identified patent and that said Letters Patent is hereby corrected as shown below:

On page 2, in column 2, item (56), under "Other Publications", line 40, delete "3a6f1b511" and insert -- 3a6f91b511 --, therefor.

Signed and Sealed this

Twenty-eighth Day of July, 2009

JOHN DOLL
*Acting Director of the United States Patent and Trademark Office*